United States Patent

Konoto et al.

(10) Patent No.: US 7,767,353 B2
(45) Date of Patent: Aug. 3, 2010

(54) FUEL CELL SYSTEM

(75) Inventors: Masaaki Konoto, Kyoto (JP); Masaya Fujii, Toyonaka (JP); Kazuhiro Seo, Hirakata (JP); Kunihisa Sekiguchi, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 1401 days.

(21) Appl. No.: 11/194,750

(22) Filed: Aug. 2, 2005

(65) Prior Publication Data

US 2006/0029846 A1 Feb. 9, 2006

(30) Foreign Application Priority Data

Aug. 6, 2004 (JP) .............................. 2004-230420
Mar. 30, 2005 (JP) .............................. 2005-097845

(51) Int. Cl.
*H01M 8/04* (2006.01)
*H01M 8/02* (2006.01)
*H01M 10/46* (2006.01)

(52) U.S. Cl. ...................... 429/432; 320/101; 429/400; 429/428

(58) Field of Classification Search ........................ None
See application file for complete search history.

(56) References Cited

U.S. PATENT DOCUMENTS 6,459,242 B1 * 10/2002 Bures et al. .................. 320/132
2004/0009381 A1 1/2004 Sakai et al.

FOREIGN PATENT DOCUMENTS

| JP | 2003-134691 | * | 5/2003 |
| JP | 2003-303609 | | 10/2003 |
| JP | 2004-039506 | | 2/2004 |
| JP | 2004-071260 | | 3/2004 |
| JP | 2004-152741 | | 5/2004 |

OTHER PUBLICATIONS

IPDL machine translation of JP2003-134691.*
Japanese Notification of Grounds of Rejection, with English translation, issued in Japanese Patent Application No. 2005-097845, dated Feb. 3, 2010.

* cited by examiner

*Primary Examiner*—Dah-Wei D Yuan
*Assistant Examiner*—Maria J Laios
(74) *Attorney, Agent, or Firm*—McDermott Will & Emery LLP

(57) ABSTRACT

A fuel cell system according to the invention comprises a fuel cell stack, a fuel feeder that supplies the fuel cell stack with fuel, a rechargeable battery that is an electric storage device, a bidirectional DC/DC converter that selectively performs an operation of converting the output voltage of the rechargeable battery into a predetermined voltage and then outputting it (a discharge operation), or an operation of charging the rechargeable battery using the electric power outputted from the fuel cell stack (a charge operation), and a mode control circuit. The mode control circuit detects the output voltage of the fuel cell stack so that, when it is higher than the set value, the mode control circuit makes the bidirectional DC/DC converter perform the charge operation; when it is not higher than the set value, the mode control circuit makes the bidirectional DC/DC converter perform the discharge operation.

5 Claims, 11 Drawing Sheets

FUEL CELL SYSTEM

This application is based on Japanese Patent Application No. 2004-230420 filed on Aug. 6, 2004 and Japanese Patent Application No. 2005-097845 filed on Mar. 30, 2005, the contents of which are hereby incorporated by reference.

BACKGROUND OF THE INVENTION

1. Field of the Invention

The present invention relates to a fuel cell system provided with a fuel cell and an electric storage device.

2. Description of Related Art

In recent years, there have been developed various types of fuel cell systems provided with a fuel cell and an electric storage device. In the fuel cell system provided with a fuel cell and an electric storage device, the electric storage device needs to be charged so as not to become empty.

When the electric storage device is charged, it is usually necessary to stop the operation of an external load of the fuel cell system. The problem here is that the capacity of the electric storage device limits the duration for which the fuel cell system can be continuously used.

To overcome this problem, Japanese Patent Application Laid-Open No. 2004-71260 discloses a fuel cell apparatus built as a system in which a fuel cell and a rechargeable battery as an electric storage device are provided in parallel. In this system, the rechargeable battery is charged when the output voltage of the fuel cell is higher than the output voltage of the rechargeable battery. This permits the rechargeable battery to be charged without stopping the operation of the external load. However, in the fuel cell apparatus disclosed in Japanese Patent Application Laid-Open No. 2004-71260, the rechargeable battery is charged even when there is no surplus electric power (=the maximum electric power of the fuel cell minus the load electric power). This may result in insufficient electric power supply for the load.

SUMMARY OF THE INVENTION

An object of the present invention is to provide a fuel cell system that can charge an electric storage device without stopping the operation of an external load.

In order to achieve the above object, according to one aspect of the present invention, a fuel cell system built as a system in which a fuel cell and an electric storage device are provided in parallel is provided with: the fuel cell; a fuel feeder that supplies the fuel cell with fuel, the electric storage device; and a bidirectional DC/DC converter that selectively performs an operation of converting the output voltage of the electric storage device into a predetermined voltage and then outputting it, or an operation of charging the electric storage device using the electric power outputted from the fuel cell. The fuel cell system is further provided with a controller that detects the output voltage of the fuel cell so that, when the output voltage of the fuel cell is higher than a previously set value, the controller makes the bidirectional DC/DC converter perform the operation of charging the electric storage device using the electric power outputted from the fuel cell, and when the output voltage of the fuel cell is not higher than the set value, the controller makes the bidirectional DC/DC converter perform the operation of converting the output voltage of the electric storage device into the predetermined voltage and then outputting it (this configuration is referred to as a first configuration). Used as the above-described electric storage device is, for example, a rechargeable battery or an electric double layer capacitor.

With this configuration, it is possible to charge the electric storage device without stopping the operation of an external load. Moreover, when there is no surplus electric power (=the maximum electric power of the fuel cell minus the load electric power), the electric storage device is discharged instead of being charged. This eliminates the possibility that the external load receives insufficient electric power supply so long as the rated output of the fuel cell and the rated capacity of the electric storage device are set appropriately.

In order to achieve the above object, according to another aspect of the present invention, a fuel cell system is built as a system in which a fuel cell and an electric storage device are provided in parallel. The fuel cell system is provided with: the fuel cell; a fuel feeder that supplies the fuel cell with fuel; the electric storage device; a bidirectional DC/DC converter that selectively performs an operation of converting the output voltage of the electric storage device into a predetermined voltage and then outputting it, or an operation of charging the electric storage device using the electric power outputted from the fuel cell; an output electric power checker that checks whether or not electric power is being supplied to an external load from the bidirectional DC/DC converter and then outputs the check result; and a controller that operates, based on the output of the output electric power checker, so that, if electric power is being supplied to the external load from the bidirectional DC/DC converter while the bidirectional DC/DC converter is made to perform the operation of converting the output voltage of the electric storage device into the predetermined voltage and then outputting it, the bidirectional DC/DC converter is made to continue the operation of converting the output voltage of the electric storage device into the predetermined voltage and outputting it, and if no electric power is being supplied to the external load from the bidirectional DC/DC converter while the bidirectional DC/DC converter is made to perform the operation of converting the output voltage of the electric storage device into the predetermined voltage and then outputting it, the bidirectional DC/DC converter is made to switch into the operation of charging the electric storage device using the electric power outputting from the fuel cell, and that detects the output voltage of the fuel cell while making the bidirectional DC/DC converter perform the operation of charging the electric storage device using the electric power outputted from the fuel cell so that, if the output voltage of the fuel cell is higher than a previously set value, the controller makes the bidirectional DC/DC converter continue the operation of charging the electric storage device using the electric power outputting from the fuel cell, and if the output voltage of the fuel cell is not higher than the set value, the controller makes the bidirectional DC/DC converter switch into the operation of converting the output voltage of the electric storage device into the predetermined voltage and then outputting it. Used as the above-described electric storage device is, for example, a rechargeable battery or an electric double layer capacitor.

With this configuration, it is possible to charge the electric storage device without stopping the operation of the external load. Moreover, when there is no surplus electric power (=the maximum electric power of the fuel cell minus the load electric power), the electric storage device is discharged instead of being charged. This eliminates the possibility that the external load receives insufficient electric power supply so long as the rated output of the fuel cell and the rated capacity of the electric storage device are set appropriately.

In the fuel cell system having the above-described first configuration, preferably, an ON/OFF control circuit that turns on and off of the operation of the bidirectional DC/DC converter is further provided so that, when the output voltage of the fuel cell is equal to or lower than the set value but higher than a predetermined value, the ON/OFF control circuit turns off the operation of the bidirectional DC/DC converter, and when the output voltage of the fuel cell is higher than the set value or equal to or lower than the predetermined value, the ON/OFF control circuit turns on the operation of the bidirectional DC/DC converter. Note that the predetermined value is made slightly larger than the predetermined voltage.

With this configuration, the bidirectional DC/DC converter operates only when it supplies electric power to the external load in discharge mode and when it is in charge mode. Thus, when no electric power is being supplied to the external load even when the bidirectional DC/DC converter is in discharge mode, no electric power is wasted in the bidirectional DC/DC converter. This helps enhance the efficiency of the fuel cell system.

From the viewpoint of enhancing the efficiency of the fuel cell system, in any of the configurations of the fuel cell system described above, the output terminal of the fuel cell and the bidirectional DC/DC converter may be directly connected together. With this configuration, no blocking diode is connected to the output side of the fuel cell. This helps enhance the efficiency of the fuel cell system because the absence of the blocking diode prevents power loss that occurs therein.

In any of the configurations of the fuel cell system described above, the predetermined voltage may be equal to or higher than the output voltage value of the fuel cell at which the output electric power of the fuel cell reaches the maximum level. With this configuration, the fuel cell does not operate within the voltage range lower than the output voltage value at which the output electric power of the fuel cell reaches the maximum level. This eliminates the possibility of reducing the life of the fuel cell.

In any of the configurations of the fuel cell system described above, there may be provided with a load electric power detector that detects the load electric power, that is, the electric power required of the fuel cell system by the external load, an output electric power checker that checks whether or not electric power is being supplied to the external load from the bidirectional DC/DC converter, and a supply fuel amount controller that receives the detection result of the load electric power detector and the check result of the output electric power checker so that, when electric power is being supplied to the external load from the bidirectional DC/DC converter even though the load electric power is lower than the threshold value, it controls the fuel feeder to supply fuel to the fuel cell.

With this configuration, when electric power is being supplied to the external load from the bidirectional DC/DC converter even though the load electric power is lower than the threshold value, the fuel cell is supplied with fuel. This helps overcome the fuel shortage in the fuel cell.

In any of the configurations of the fuel cell system described above, the fuel feeder may supply a predetermined amount of fuel to the fuel cell at regular intervals, and recover the fuel that has not been consumed by the fuel cell. This makes it possible to reuse the fuel that has not been consumed.

In order to achieve the above object, according to still another aspect of the present invention, a fuel cell system is provided with: a fuel cell; a fuel feeder that supplies the fuel cell with fuel; a plurality of sets of an electric storage device and a bidirectional DC/DC converter, each bidirectional DC/DC converter selectively performing an operation of converting the output voltage of the electric storage device into a predetermined voltage and then outputting it, or an operation of charging the electric storage device using the electric power outputted from the fuel cell; a switcher that switches between the fuel cell and an external load as a destination to which each electric storage device is connected; and a controller that controls the bidirectional DC/DC converter and the switcher so that any bidirectional DC/DC converter located between an electric storage device connected to the fuel cell and the fuel cell performs the operation of charging the electric storage device using the electric power outputted from the fuel cell, and any bidirectional DC/DC converter located between an electric storage device connected to the external load and the external load performs the operation of converting the output voltage of the electric storage device into the predetermined voltage and then outputting it. Used as the above-described electric storage device is, for example, a rechargeable battery or an electric double layer capacitor.

With this configuration, it is possible to charge the electric storage device without stopping the operation of the external load. Moreover, so long as the rated output of the fuel cell, the rated capacity of the electric storage device, and the selection switching criteria of the switcher are set appropriately, there is no possibility that the external load receives insufficient electric power supply.

In any of the configurations of the fuel cell system described above, the fuel feeder may operate with electric power derived from the output of the fuel cell system. This eliminates the need to provide a separate power source for the fuel feeder.

In order to achieve the above object, according to still another aspect of the present invention, a fuel cell system is provided with: a fuel cell; an electric storage device; an electric storage device DC/DC converter that converts the output voltage of the electric storage device; and a charge circuit that charges the electric storage device. The output terminal of the fuel cell, the output terminal of the electric storage device DC/DC converter, and the input terminal of the charge circuit are connected together. The charge circuit is turned on and off according to the voltage at the node at which the output terminal of the fuel cell, the output terminal of the electric storage device DC/DC converter, and the input terminal of the charge circuit are connected together. Used as the above-described electric storage device is, for example, a rechargeable battery or an electric double layer capacitor.

With this configuration, it is possible to charge the electric storage device without stopping the operation of the external load. Moreover, the electric storage device DC/DC converter that is a circuit for discharging the electric storage device and the charge circuit that is a circuit for charging the electric storage device are provided separately. This makes it easier to follow an abrupt load change. Furthermore, the electric storage device DC/DC converter may be kept always ON. This enhances the ability to follow an abrupt load change when there is a sudden increase in load.

In order to achieve the above object, according to still another aspect of the present invention, a fuel cell system is provided with: a fuel cell; a fuel cell DC/DC converter that converts the output voltage of the fuel cell; an electric storage device; an electric storage device DC/DC converter that converts the output voltage of the electric storage device; and a charge circuit that charges the electric storage device. The output terminal of the fuel cell DC/DC converter, the output terminal of the electric storage device DC/DC converter, and the input terminal of the charge circuit are connected together. The charge circuit is turned on and off according to the voltage at the node at which the output terminal of the fuel cell DC/DC converter, the output terminal of the electric storage device DC/DC converter, and the input terminal of the charge circuit are connected together. Used as the above-described electric storage device is, for example, a rechargeable battery or an electric double layer capacitor.

With this configuration, it is possible to charge the electric storage device without stopping the operation of the external load. Moreover, the electric storage device DC/DC converter that is a circuit for discharging the electric storage device and the charge circuit that is a circuit for charging the electric storage device are provided separately. This makes it easier to follow an abrupt load change. Furthermore, the electric storage device DC/DC converter may be kept always ON. This enhances the ability to follow an abrupt load change when there is a sudden increase in load.

In order to achieve the above object, according to still another aspect of the present invention, a fuel cell system is built as a system in which a fuel cell and an electric storage device are provided in parallel, and is provided with: the fuel cell; the electric storage device; an electric storage device DC/DC converter that converts the output voltage of the electric storage device; a charge circuit that charges the electric storage device using the electric power derived from the fuel cell; and a controller that controls the discharge electric power and the charge electric power of the electric storage device according to the load electric power.

With this configuration, it is possible to charge the electric storage device without stopping the operation of the external load. Moreover, the electric storage device DC/DC converter that is a circuit for discharging the electric storage device and the charge circuit that is a circuit for charging the electric storage device are provided separately. This makes it easier to follow an abrupt load change. Furthermore, the discharge electric power and the charge electric power of the electric storage device are controlled according to the load electric power. This permits the electric power outputted from the fuel cell to be kept constant. Note that, to perform control according to the load electric power, the controller needs to be provided with a load electric power detection circuit that detects the load electric power. However, when the load voltage is kept constant, the load electric power detection circuit may be replaced with a load current detection circuit that detects the load current.

In any of the configurations of the fuel cell system described above, from the viewpoint of preventing system startup failure due to insufficient electric power remaining in the electric storage device, there may be provided with a remaining electric power detection circuit that detects the electric power remaining in the electric storage device, a supply stopper that makes the fuel cell system stop supplying electric power to the outside when the electric power remaining in the electric storage device as detected by the remaining electric power detection circuit becomes equal to or lower than a predetermined value, and an electric storage device preferential charger that preferentially charges the electric storage device when the electric power remaining in the electric storage device becomes equal to or lower than the predetermined value. Moreover, to prevent the user from being misled into thinking that the fuel cell system has failed, it is preferable to provide an indicator that indicates, when the electric power remaining in the electric storage device as detected by the remaining electric power detection circuit becomes equal to or lower than the predetermined value, that the electric power remaining in the electric storage device has become equal to or lower than the predetermined value.

DETAILED DESCRIPTION OF PREFERRED EMBODIMENTS

Figure 1:
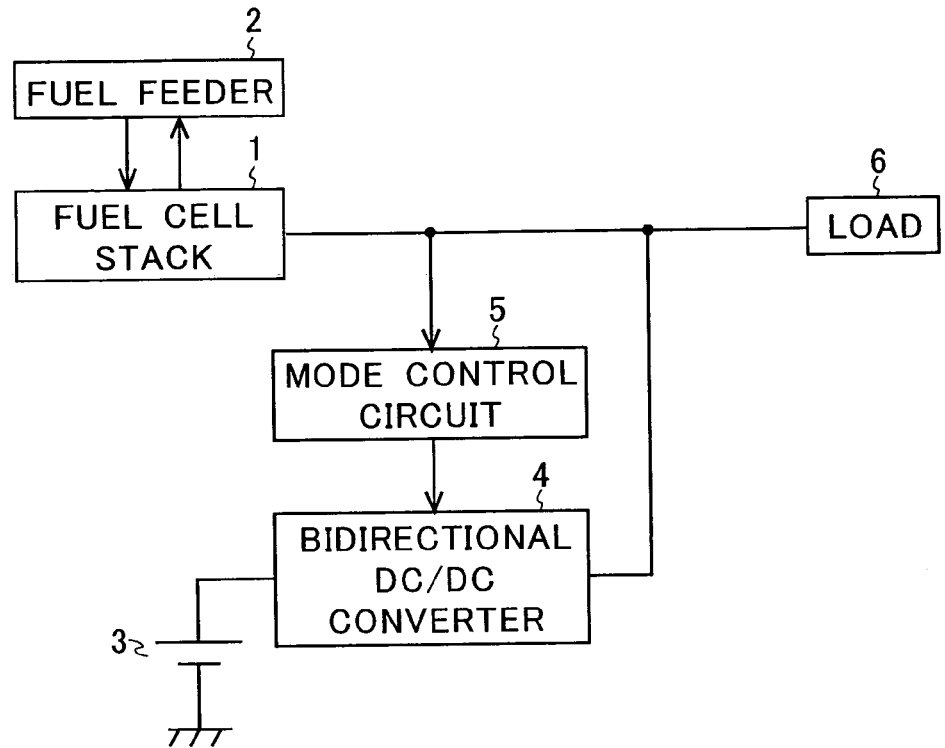
FIG. 1 is a block diagram showing an example of the configuration of a fuel cell system according to the invention.

FIG. 1 shows an example of the configuration of a fuel cell system according to the invention. The fuel cell system according to the invention shown in FIG. 1 is built as a system in which a fuel cell and an electric storage device are provided in parallel. The fuel cell system comprises a fuel cell stack 1, a fuel feeder 2, a rechargeable battery 3 that is an electric storage device, a bidirectional DC/DC converter 4, and a mode control circuit 5. The fuel feeder 2 supplies the fuel cell stack 1 with a predetermined amount of fuel at regular intervals, and recovers the fuel that has not been consumed by the fuel cell stack 1. The positive electrode of the rechargeable battery 3 is connected to one end of the bidirectional DC/DC converter 4. The output terminal of the fuel cell stack 1 and the other end of the bidirectional DC/DC converter 4 are connected together, and are then connected to the load 6. The mode control circuit 5 controls the mode of the bidirectional DC/DC converter 4.

The fuel feeder 2 operates with electric power derived from the output of the fuel cell system. That is, although the fuel feeder 2 and the load 6 are illustrated as separate blocks in FIG. 1 for the sake of convenience, in reality the fuel feeder 2 is part of the load 6.

The bidirectional DC/DC converter 4 is configured so as to allow the rechargeable battery 3 to be charged and discharged. In discharge mode, the bidirectional DC/DC converter 4 steps up the output voltage of the rechargeable battery 3, and then outputs it to the load 6; in charge mode, the bidirectional DC/DC converter 4 steps down the voltage supplied from the fuel cell stack 1, and then outputs it to the rechargeable battery 3.

Figure 2:
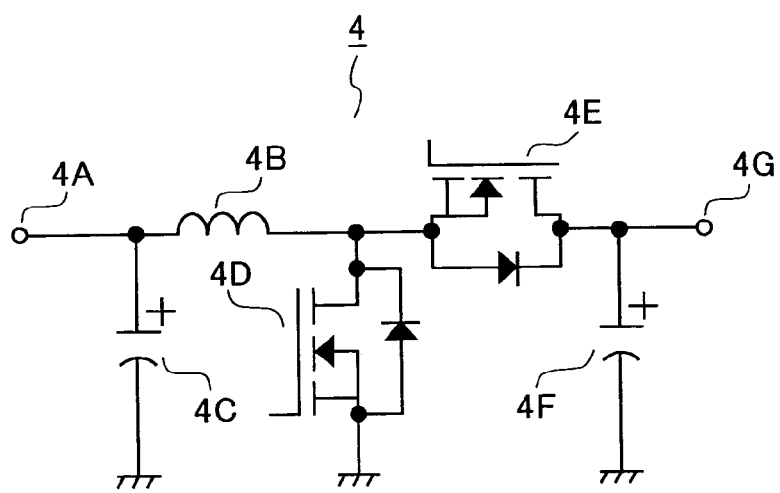
FIG. 2 is a diagram showing an example of the configuration of the bidirectional converter provided in the fuel cell system according to the invention.

Now, an example of the configuration of the bidirectional DC/DC converter 4 will be described with reference to FIG. 2. The bidirectional DC/DC converter 4 includes: a terminal 4A connected to the rechargeable battery 3 (not shown in FIG. 2); a coil 4B; a capacitor 4C; a discharge switching device 4D; a charge switching device 4E; a capacitor 4F; and a terminal 4G connected to the fuel cell stack 1 (not shown in FIG. 2) and the load 6 (not shown in FIG. 2). The discharge switching device 4D is composed of: a MOSFET (metal-oxide semiconductor field-effect transistor); and a diode with its cathode toward the coil 4B. The charge switching device 4E is composed of: a MOSFET; and a diode with its anode toward the coil 4B. The terminal 4A is connected to one end of the coil 4B and to one end of the capacitor 4C. The other end of the coil 4B is connected to one end of the discharge switching device 4D and to one end of the charge switching device 4E. The other ends of the capacitor 4C and the discharge switching device 4D are at the same potential as the negative electrodes of the rechargeable battery 3 and of the fuel cell stack 1. The other end of the charge switching device 4E is connected to one end of the capacitor 4F and to the terminal 4G. The other end of the capacitor 4F is at the same potential as the negative electrodes of the rechargeable battery 3 and of the fuel cell stack 1.

In discharge mode, while the MOSFET constituting the discharge switching device 4D is on and the MOSFET constituting the charge switching device 4E is off, the output voltage of the rechargeable battery 3 (not shown in FIG. 2) causes the coil 4B to accumulate energy. Then, the MOSFET constituting the discharge switching device 4D is turned off and the MOSFET constituting the charge switching device 4E is turned on, so that the energy accumulated in the coil 4B, passing via the source-drain of the MOSFET constituting the charge switching device 4E and the diode serving as a rectifying device, is stabilized by the capacitor 4F and is then supplied to the load 6 (not shown in FIG. 2) connected to the terminal 4G. In this manner, step-up discharging is performed.

On the other hand, in charge mode, while the MOSFET constituting the charge switching device 4E is on and the MOSFET constituting the discharge switching device 4D is off, the electric power outputted from the fuel cell stack 1 (not shown in FIG. 2) is supplied, via the coil 4B, to the rechargeable battery 3 (not shown in FIG. 2) to charge it. Then, the MOSFET constituting the charge switching device 4E is turned off and the MOSFET constituting the discharge switching device 4D is turned on, so that a current flows via the capacitor 4C and also via the source-drain of the MOSFET constituting the discharge switching device 4D and the diode serving as a rectifying device. This cancels out the energy accumulated in the coil 4B. In this manner, step-down charging is performed.

Now, the description of the fuel cell system shown FIG. 1 will be continued. Since the fuel feeder 2 supplies the fuel cell stack 1 with a predetermined amount of fuel at regular intervals, the fuel cell stack 1 has the current-voltage characteristic and the current-power characteristic shown in FIG. 3. The symbols $T_{I-V}$ and $T_{I-P}$ shown in FIG. 3 indicate the output current-output voltage characteristic curve and the output current-output power characteristic curve, respectively, of the fuel cell stack 1. The output voltage of the fuel cell stack 1 is varied according to the output current thereof. Specifically, the larger the output current becomes, the lower the output voltage becomes. The output current value Ipmax at which the output electric power reaches the maximum level depends on the amount of fuel supplied to the fuel cell stack 1 from the fuel feeder 2.

Figure 3:
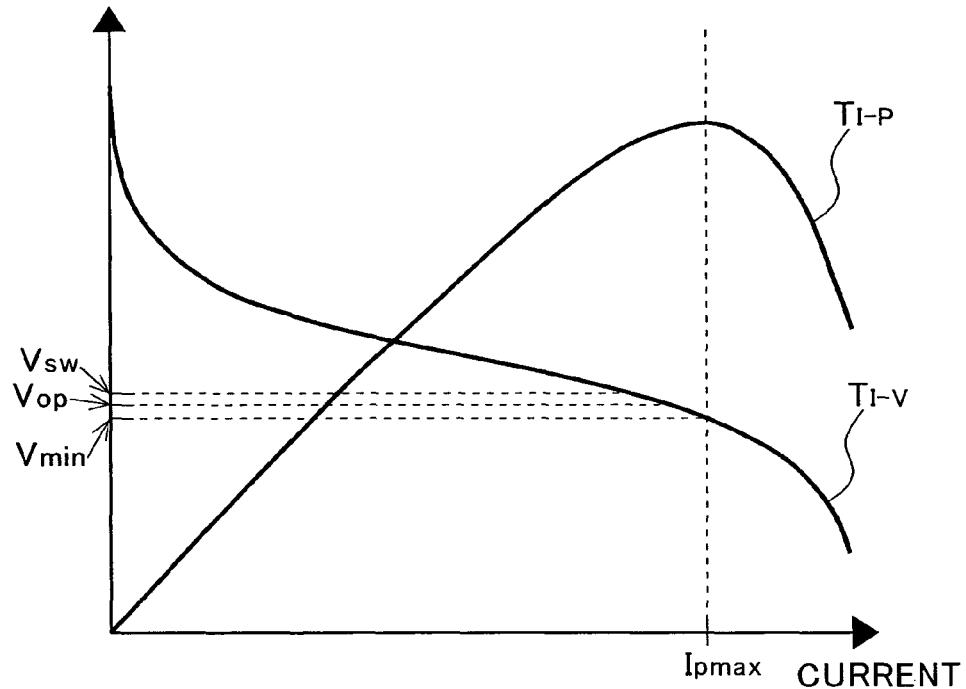
FIG. 3 is a graph showing the current-voltage characteristic and the current-power characteristic of the fuel cell stack.

The mode control circuit 5 detects the output voltage of the fuel cell stack 1, and checks whether or not it is higher than the previously set mode switch voltage Vsw (see FIG. 3). When the output voltage of the fuel cell stack 1 is found to be higher than the mode switch voltage Vsw, the mode control circuit 5 brings the bidirectional DC/DC converter 4 into charge mode because there is sufficient surplus electric power (=the maximum output electric power of the fuel cell stack 1 minus the electric power required by the load 6). On the other hand, when the output voltage of the fuel cell stack 1 is found not to be higher than the mode switch voltage Vsw, the mode control circuit 5 brings the bidirectional DC/DC converter 4 into discharge mode.

Thanks to the mode control circuit 5 performing the above-described control, it is possible to charge the rechargeable battery 3 without stopping the operation of the load 6. Moreover, when there is no surplus electric power, the rechargeable battery 3 is discharged instead of being charged. This eliminates the possibility that the load 6 receives insufficient electric power supply so long as the rated output of the fuel cell stack 1, the rated capacity of the rechargeable battery 3, and the output voltage value of the bidirectional DC/DC converter 4 in discharge mode are set appropriately.

Note that, as shown in FIG. 3, it is preferable that the output voltage set value Vop of the bidirectional DC/DC converter 4 in discharge mode be set equal to or larger than the output voltage value Vmin of the fuel cell stack 1 at which the output electric power of the fuel cell stack 1 reaches the maximum level. When the output voltage set value Vop of the bidirectional DC/DC converter 4 in discharge mode is set equal to or larger than the output voltage value Vmin of the fuel cell stack 1 at which the output electric power of the fuel cell stack 1 reaches the maximum level, the fuel cell stack 1 does not operate within the voltage range lower than Vmin (=the current range larger than Ipmax). This eliminates the possibility of reducing the life of the fuel cell stack 1.

From the view point of enhancing the efficiency of the fuel cell system, the fuel cell system according to the invention shown in FIG. 1 is not provided with a blocking diode whose anode is connected to the output terminal of the fuel cell stack 1. This causes no problem at all because, unlike in the rechargeable battery, reverse charging (charging from a higher voltage battery to a lower voltage battery) does not occur in the fuel cell stack 1. On the contrary, the absence of the blocking diode allows the fuel cell system to enhance efficiency because it prevents power loss that occurs in the blocking diode. Note that, although the efficiency of the fuel cell system is reduced, the fuel cell system may be provided with the blocking diode.

Figure 4:
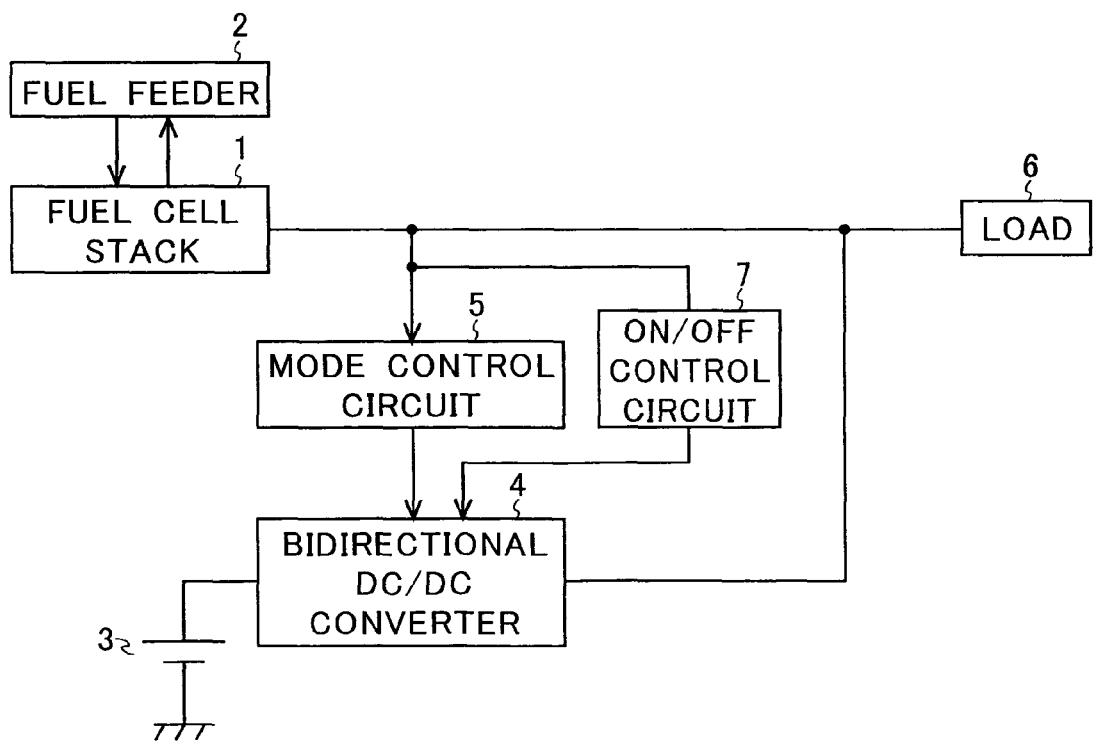
FIG. 4 is a block diagram showing a modified example of the fuel cell system shown in FIG. 1.

As shown in FIG. 4, the fuel cell system shown in FIG. 1 may be additionally provided with an ON/OFF control circuit 7. The ON/OFF control circuit 7 detects the output voltage of the fuel cell stack 1, and checks whether it is higher than a predetermined value or not. When the output voltage of the fuel cell stack 1 is found to be equal to or lower than the mode switch voltage Vsw but higher than the predetermined value, the ON/OFF control circuit 7 causes the bidirectional DC/DC converter 4 to stop voltage conversion. When the output voltage of the fuel cell stack 1 is found to be higher than the mode switch voltage Vsw, the ON/OFF control circuit 7 causes the bidirectional DC/DC converter 4 to charge the rechargeable battery 3. When the output voltage of the fuel cell stack 1 is found to be equal to or lower than the predetermined value, the ON/OFF control circuit 7 causes the bidirectional DC/DC converter 4 to perform voltage conversion. Here, the predetermined value is set at a value that is slightly larger than the output voltage set value Vop of the bidirectional DC/DC converter 4 in discharge mode but smaller than the mode switch voltage Vsw.

With this configuration, when no electric power is being supplied to the load 6 even when the bidirectional DC/DC converter 4 is in discharge mode, no electric power is wasted in the bidirectional DC/DC converter 4. This helps enhance the efficiency of the fuel cell system.

Note that it is preferable that the ON/OFF control circuit 7 detect the fully charged state of the rechargeable battery 3, so that, when the rechargeable battery 3 is found to be fully charged, the ON/OFF control circuit 7 causes the bidirectional DC/DC converter 4 to stop charging irrespective of the value of the output voltage of the fuel cell stack 1.

Even a fuel cell system provided with a blocking diode may be additionally provided with an ON/OFF control circuit 7 so that no electric power is wasted in the bidirectional DC/DC converter 4 when no electric power is being supplied to the load 6 even though the bidirectional DC/DC converter 4 is in discharge mode. This helps enhance the efficiency of the fuel cell system. However, from the viewpoint of further enhancing the efficiency of the fuel cell system, it is preferable that a fuel cell system be configured as shown in FIG. 4 and do away with a blocking diode.

Figure 5:
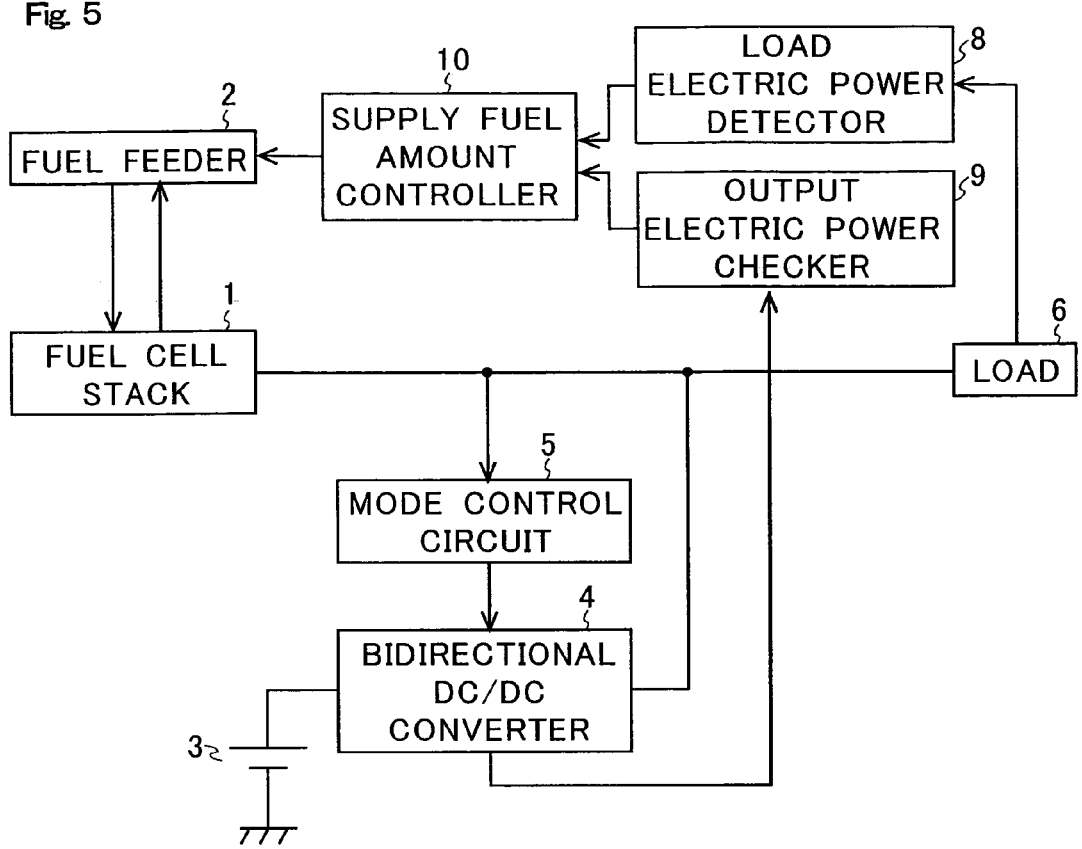
FIG. 5 is a block diagram showing another modified example of the fuel cell system shown in FIG. 1.

As shown in FIG. 5, the fuel cell system shown in FIG. 1 may be additionally provided with a load electric power detector 8, an output electric power checker 9, and a supply fuel amount controller 10.

Figure 6:
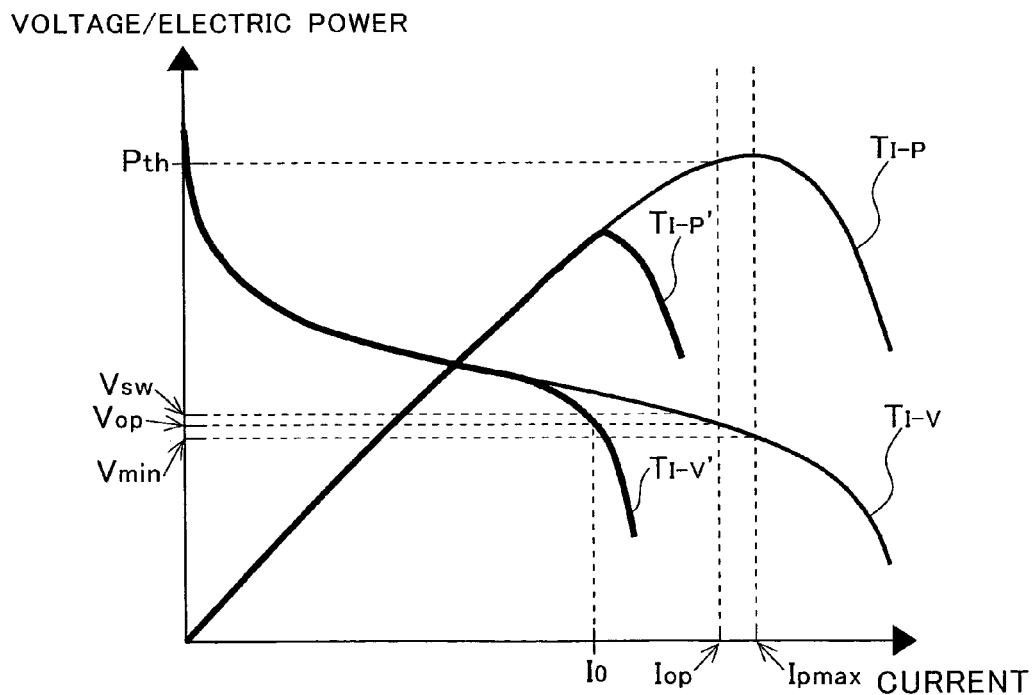
FIG. 6 is a graph showing the current-voltage characteristic and the current-power characteristic of the fuel cell stack.

Even when a predetermined amount of fuel is supplied to the fuel cell stack 1 at regular intervals, the concentration of fuel varies due to loss in the recovery of unreacted fuel, evaporation resulting from an increase in the ambient temperature, and the like. When the fuel concentration becomes low, the output current-output voltage characteristic curve and the output current-output power characteristic curve of the fuel cell stack 1 change as indicated by $T_{I-V}'$ and $T_{I-P}'$, respectively, in FIG. 6. In this state, the electric power that can be extracted from the fuel cell stack 1 is lower than that stated in the design specifications. This state is what is called fuel shortage.

The load electric power detector 8 detects the electric power required by the load 6 of the fuel cell system (hereinafter, referred to as the load electric power), and then outputs the detection result to the supply fuel amount controller 10. For example, when the load 6 is a DC/DC converter, the output voltage of the DC/DC converter is fixed at a predetermined set value. This permits the load electric power detector 8 to detect the load electric power by detecting the output current of the DC/DC converter.

The output electric power checker 9 checks whether or not electric power is being supplied to the load 6 from the bidirectional DC/DC converter 4, and then outputs the check result to the supply fuel amount controller 10. The output electric power checker 9 detects the input current or the output current of the bidirectional DC/DC converter 4 in discharge mode. When the detected current value is not equal to zero, electric power is recognized to be being supplied to the load 6 from the bidirectional DC/DC converter 4. By contrast, when the detected current value is equal to zero, electric power is recognized not to be being supplied to the load 6 from the bidirectional DC/DC converter 4.

If electric power is being supplied to the load 6 from the bidirectional DC/DC converter 4 even though the load electric power is lower than the threshold value Pth, the supply fuel amount controller 10 judges that the fuel cell receives insufficient fuel supply, and thus controls the fuel feeder 2 to supply fuel to the fuel cell stack 1 even at irregular intervals. Note that, within the current range from $I_0$ to below Iop, electric power is supplied to the load 6 from the bidirectional DC/DC converter 4 even when the load electric power is lower than the threshold value Pth. The lower the load electric power is when the bidirectional DC/DC converter 4 starts to supply electric power to the load 6, the larger amount of fuel the fuel cell runs short of. Thus, it is preferable to increase the amount of supplied fuel accordingly.

If electric power is being supplied to the load 6 from the bidirectional DC/DC converter 4 even though the load electric power is smaller than the threshold value Pth, the supply fuel amount controller 10 judges that the fuel cell receives insufficient fuel supply, and thus controls the fuel feeder 2 to supply fuel to the fuel cell stack 1 even at irregular intervals. This helps overcome the fuel shortage in the fuel cell.

Even a fuel cell system provided with a blocking diode may be additionally provided with a load electric power detector 8, an output electric power checker 9, and a supply fuel amount controller 10 as described above to overcome fuel shortage in the fuel cell. However, from the viewpoint of enhancing the efficiency of a fuel cell system, it is preferable that a fuel cell system be configured as shown in FIG. 5 and do away with a blocking diode.

Next, another example of the configuration of the fuel cell system according to the invention will be described with reference to FIG. 7. Note that, in FIG. 7, such members as are found also in FIG. 1 are identified with common reference numerals, and their detailed descriptions will be omitted. The fuel cell system shown in FIG. 7 differs from the fuel cell system shown in FIG. 1 in that the mode control circuit 5 is replaced with a mode control circuit 5' and an output electric power checker 11 is additionally provided.

The output electric power checker 11 checks whether or not electric power is being supplied to the load 6 from the bidirectional DC/DC converter 4, and then outputs the check result to the mode control circuit 5'. The output electric power checker 11 detects the input current or the output current of the bidirectional DC/DC converter 4 in discharge mode. When the detected current value is not equal to zero, electric power is recognized to be being supplied to the load 6 from the bidirectional DC/DC converter 4. By contrast, when the detected current value is equal to zero, electric power is recognized not to be being supplied to the load 6 from the bidirectional DC/DC converter 4.

Based on the output from the output electric power checker 11, the mode control circuit 5' operates as follows. If electric power is recognized to be being supplied to the load 6 from the bidirectional DC/DC converter 4 when the bidirectional DC/DC converter 4 is in discharge mode, the mode control circuit 5' maintains the discharge mode of the bidirectional DC/DC converter 4. By contrast, if electric power is recognized not to be being supplied to the load 6 from the bidirectional DC/DC converter 4 when the bidirectional DC/DC converter 4 is in discharge mode, the mode control circuit 5' brings the bidirectional DC/DC converter 4 into charge mode. Furthermore, the mode control circuit 5' detects the output voltage of the fuel cell stack 1 while the bidirectional DC/DC converter 4 is in charge mode, and checks whether or not the output voltage of the fuel cell stack 1 is higher than the mode switch voltage Vsw (see FIG. 3). When the output voltage of the fuel cell stack 1 is higher than the mode switch voltage Vsw, the mode control circuit 5' maintains the charge mode of the bidirectional DC/DC converter 4. On the other hand, when the output voltage of the fuel cell stack 1 is equal to or lower than the mode switch voltage Vsw, the mode control circuit 5' brings the bidirectional DC/DC converter 4 into discharge mode.

Thanks to the mode control circuit 5' performing the above-described control, it is possible to charge the rechargeable battery 3 without stopping the operation of the load 6. Moreover, when there is no surplus electric power, the rechargeable battery 3 is discharged instead of being charged. This eliminates the possibility that the load 6 receives insufficient electric power supply so long as the rated output of the fuel cell stack 1, the rated capacity of the rechargeable battery 3, and the output voltage value of the bidirectional DC/DC converter 4 in discharge mode are set appropriately.

Note that, as shown in FIG. 3, it is preferable that the output voltage set value Vop of the bidirectional DC/DC converter 4 in discharge mode be set equal to or larger than the output voltage value Vmin of the fuel cell stack 1 at which the output electric power of the fuel cell stack 1 reaches the maximum level. When the output voltage set value Vop of the bidirectional DC/DC converter 4 in discharge mode is set equal to or larger than the output voltage value Vmin of the fuel cell stack 1 at which the output electric power of the fuel cell stack 1 reaches the maximum level, the fuel cell stack 1 does not operate within a voltage range smaller than Vmin (=a current range larger than Ipmax). This eliminates the possibility of reducing the life of the fuel cell stack 1.

Figure 7:
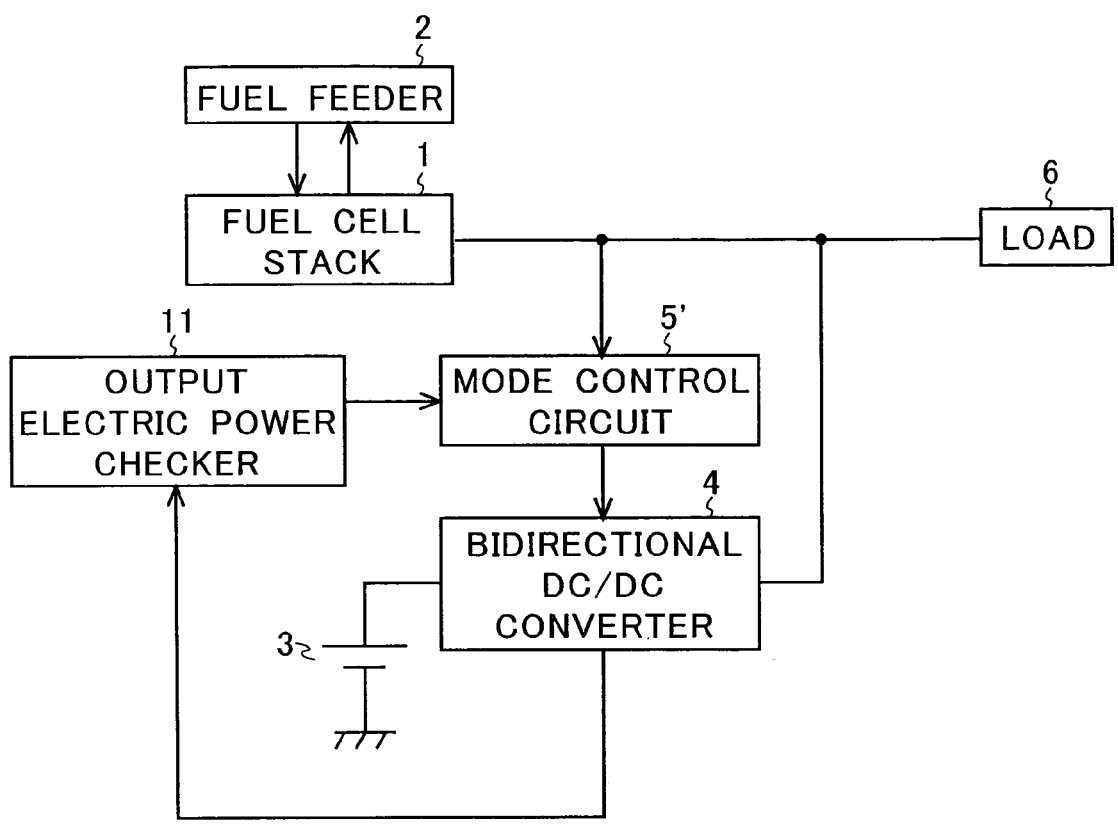
FIG. 7 is a block diagram showing another example of the configuration of the fuel cell system according to the invention.

From the viewpoint of enhancing the efficiency of the fuel cell system; the fuel cell system according to the invention shown in FIG. 7 is not provided with a blocking diode whose anode is connected to the output terminal of the fuel cell stack 1. This causes no problem at all because, unlike in the rechargeable battery, reverse charging (charging from a higher voltage battery to a lower voltage battery) does not occur in the fuel cell stack 1. On the contrary, the absence of the blocking diode allows the fuel cell system to enhance efficiency because it prevents power loss that occurs in the blocking diode. Note that, although the efficiency of the fuel cell system is reduced, the fuel cell system may be provided with the blocking diode.

Figure 8:
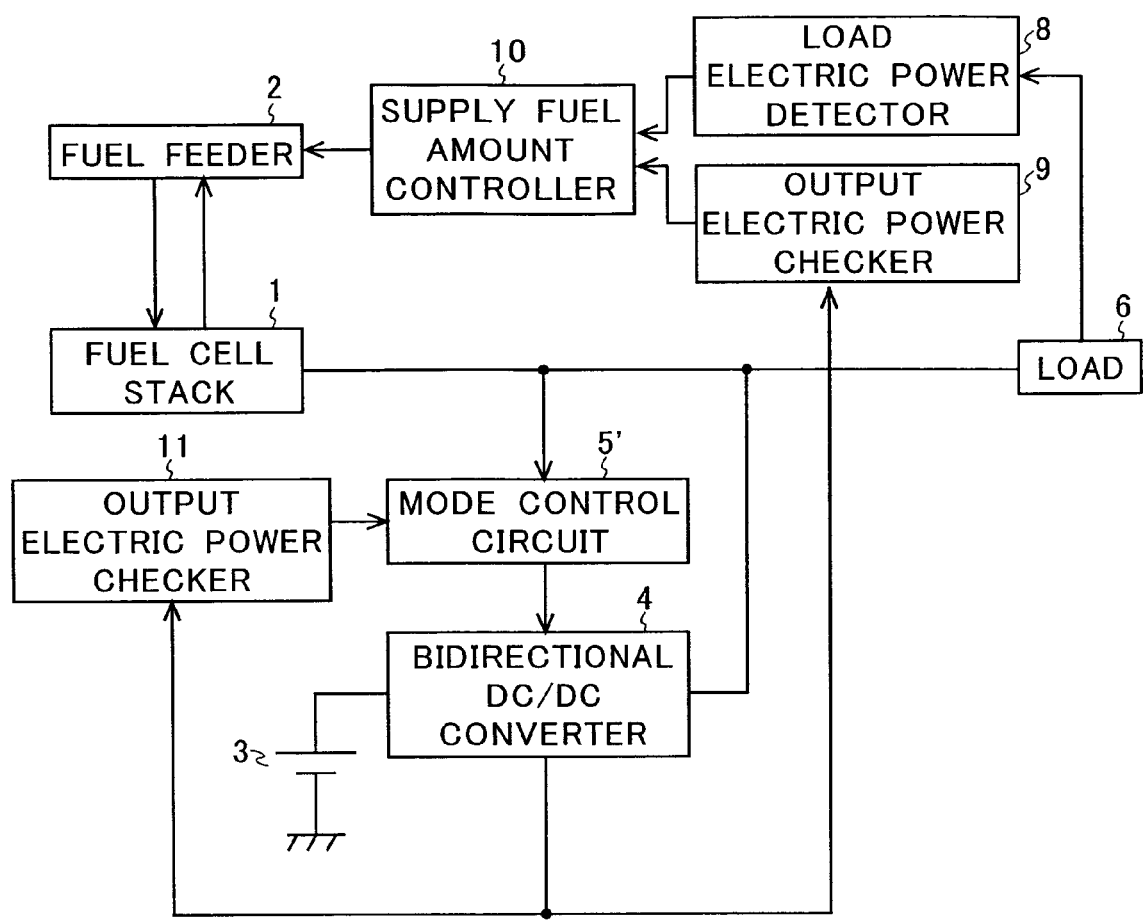
FIG. 8 is a block diagram showing a modified example of the fuel cell system shown in FIG. 7.

As shown in FIG. 8, the fuel cell system shown in FIG. 7 may be additionally provided with a load electric power detector 8, an output electric power checker 9, and a supply fuel amount controller 10.

Even when a predetermined amount of fuel is supplied to the fuel cell stack 1 at regular intervals, the concentration of fuel varies due to loss in the recovery of unreacted fuel, evaporation resulting from an increase in the ambient temperature, and the like. When the fuel concentration becomes low, the output current-output voltage characteristic curve and the output current-output power characteristic curve of the fuel cell stack 1 change as indicated by $T_{I-V}'$ and $T_{I-P}'$, respectively, in FIG. 6. In this state, the electric power that can be extracted from the fuel cell stack 1 becomes lower than that described in the design specification. This state is what is called fuel shortage.

The load electric power detector 8 detects the electric power required by the load 6 of the fuel cell system (hereinafter, referred to as the load electric power), and then outputs the detection result to the supply fuel amount controller 10. For example, when the load 6 is a DC/DC converter, the output voltage of the DC/DC converter is fixed at a predetermined set value. This permits the load electric power detector 8 to detect the load electric power by detecting the output current of the DC/DC converter.

The output electric power checker 9 checks whether or not electric power is being supplied to the load 6 from the bidirectional DC/DC converter 4, and then outputs the check result to the supply fuel amount controller 10. The output electric power checker 9 detects the input current or the output current of the bidirectional DC/DC converter 4 in discharge mode. When the detected current value is not equal to zero, electric power is recognized to be being supplied to the load 6 from the bidirectional DC/DC converter 4. By contrast, when the detected current value is equal to zero, electric power is recognized not to be being supplied to the load 6 from the bidirectional DC/DC converter 4.

If electric power is being supplied to the load 6 from the bidirectional DC/DC converter 4 even though the load electric power is smaller than the threshold value Pth, the supply fuel amount controller 10 judges that the fuel cell receives insufficient fuel supply, and thus controls the fuel feeder 2 to supply fuel to the fuel cell stack 1 even at irregular intervals. Note that, within a current range from $I_0$ to below Iop, electric power is supplied to the load 6 from the bidirectional DC/DC converter 4 even when the load electric power is smaller than the threshold value Pth. The lower the load electric power is when the bidirectional DC/DC converter 4 starts to supply electric power to the load 6, the larger amount of fuel the fuel cell runs short of. Thus, it is preferable to increase the amount of supplied fuel accordingly.

If electric power is being supplied to the load 6 from the bidirectional DC/DC converter 4 even though the load electric power is smaller than the threshold value Pth, the supply fuel amount controller 10 judges that the fuel cell receives insufficient fuel supply, and thus controls the fuel feeder 2 to supply fuel to the fuel cell stack 1 even at irregular intervals. This helps overcome the fuel shortage in the fuel cell.

Even a fuel cell system provided with a blocking diode may be additionally provided with a load electric power detector 8, an output electric power checker 9, and a supply fuel amount controller 10 as described above to overcome fuel shortage in the fuel cell. However, from the viewpoint of enhancing the efficiency of a fuel cell system, it is preferable that a fuel cell system be configured as shown in FIG. 8 and do away with a blocking diode. Furthermore, since the output electric power checker 9 and the output electric power checker 11 have the same function, it is preferable that they be integrated into one.

Next, still another example of the configuration of the fuel cell system according to the invention will be described with reference to FIG. 9. Note that, in FIG. 9, such members as are found also in FIG. 1 are identified with common reference numerals, and their detailed descriptions will be omitted.

Figure 9:
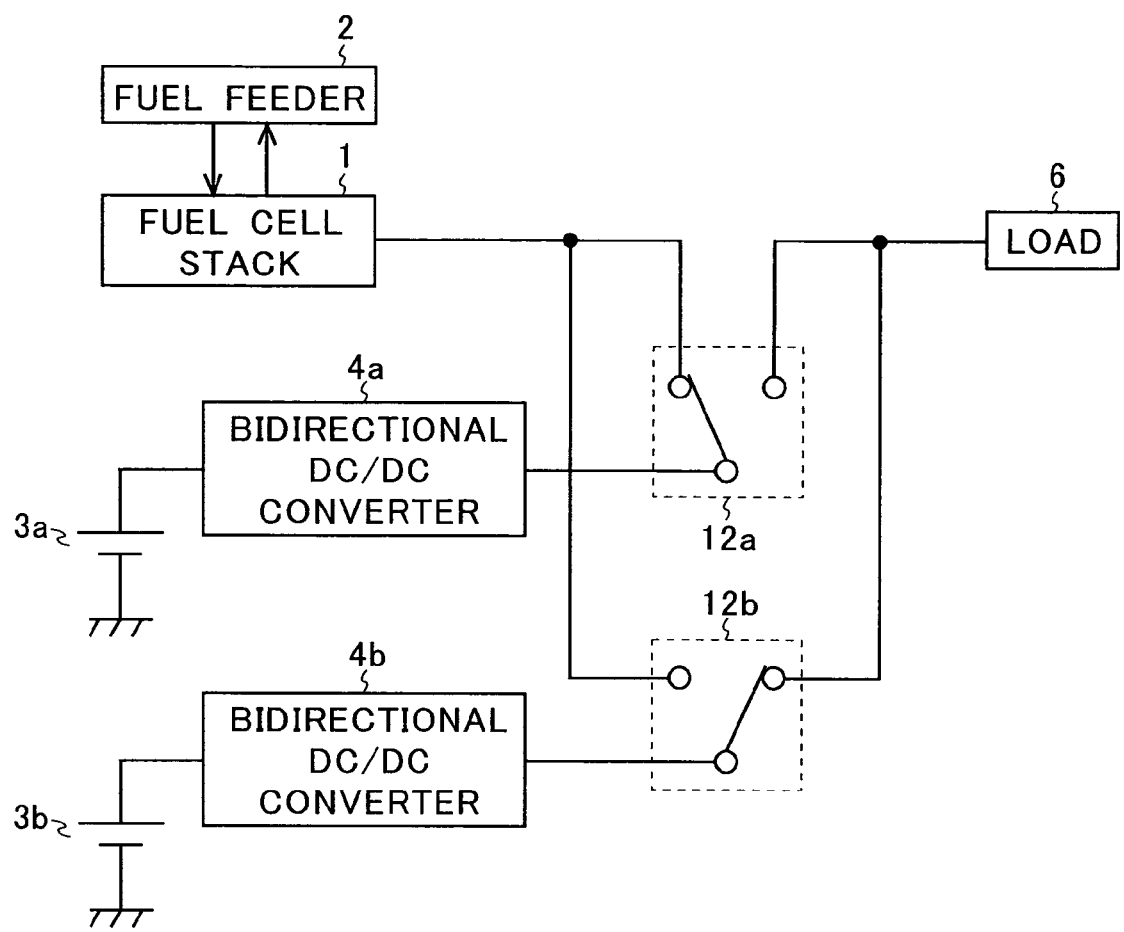
FIG. 9 is a block diagram showing still another example of the configuration of the fuel cell system according to the invention.

The fuel cell system shown in FIG. 9 comprises the fuel cell stack 1, the fuel feeder 2, rechargeable batteries 3a and 3b, bidirectional DC/DC converters 4a and 4b, switches 12a and 12b, and a control circuit (not shown) that controls bidirectional DC/DC converters 4a and 4b and the switches 12a and 12b.

The positive electrode of the rechargeable battery 3a is connected to one end of the bidirectional DC/DC converter 4a. The switch 12a selects either the fuel cell stack 1 or the load 6, so that the selected one is electrically connected to the other end of the bidirectional DC/DC converter 4a.

The positive electrode of the rechargeable battery 3b is connected to one end of the bidirectional DC/DC converter 4b. The switch 12b selects either the fuel cell stack 1 or the load 6, so that the selected one is electrically connected to the other end of the bidirectional DC/DC converter 4b.

When the switch 12a selects the load 6, the switch 12b is made to select the fuel cell stack 1. By contrast, when the switch 12a selects the fuel cell stack 1, the switch 12b is made to select the load 6. When the switch 12a selects the load 6, the bidirectional DC/DC converter 4a is brought into discharge mode. By contrast, when the switch 12a selects the fuel cell stack 1, the bidirectional DC/DC converter 4a is brought into charge mode. When the switch 12b selects the load 6, the bidirectional DC/DC converter 4b is brought into discharge mode. By contrast, when the switch 12b selects the fuel cell stack 1, the bidirectional DC/DC converter 4b is brought into charge mode.

If the electric power remains in the rechargeable battery 3a is equal to or lower than a predetermined value while the load 6 is selected by the switch 12a, the switch 12a is made to select the fuel cell stack 1; if the electric power remains in the rechargeable battery 3b is equal to or lower than the predetermined value while the load 6 is selected by the switch 12b, the switch 12b is made to select the fuel cell stack 1.

With this configuration, it is possible to charge the rechargeable batteries 3a and 3b without stopping the operation of the load 6. Moreover, so long as the rated output of the fuel cell stack 1, the rated capacities of the rechargeable batteries 3a and 3b, and the selection switching criteria of the switches 12a and 12b are set appropriately, there is no possibility that the load 6 receives insufficient electric power supply.

Furthermore, adopting a DMFC (Direct Methanol Fuel Cell) stack, for example, as the fuel cell stack 1 permits the fuel cell system shown in FIG. 9 to be made smaller than a cell system composed of rechargeable batteries alone because methanol, which is used as fuel for DMFC, can yield a large amount of energy.

From the viewpoint of enhancing the efficiency of the fuel cell system, it is preferable that the fuel cell stack 1 be made to output a fixed electric power so that no fuel is left unreacted and recovered by the fuel feeder 2.

Obviously, many modifications and variations of the present invention are possible in light of the above teachings. It is therefore to be understood that within the scope of the appended claims, the invention may be practiced other than as specifically described. For example, a fuel cell system may adopt the configuration in which the configuration shown in FIG. 4 and the configuration shown in FIG. 5 are combined. Although two rechargeable batteries, two bidirectional DC/DC converters, and two switches are used in the fuel cell system shown in FIG. 9, it is in practice possible to use three or more rechargeable batteries, three or more bidirectional DC/DC converters, and three or more switches instead.

In the above-described fuel cell system according to the invention provided with a bidirectional DC/DC converter, when there is a sudden increase in load, switching from charging to discharging cannot be performed instantaneously because it takes some time to bring the bidirectional DC/DC converter thus far in charge mode into discharge mode. This may make it impossible to follow abrupt fluctuations in the load.

To overcome this inconvenience, in the following embodiment, a rechargeable battery charge circuit and a rechargeable battery discharge circuit are provided separately. Furthermore, to enhance the ability to follow an abrupt load change when there is a sudden increase in load, the rechargeable battery discharge circuit is kept always ON.

Now, an example of the configuration of a fuel cell system according to the invention that can follow an abrupt load change will be described with reference to FIG. 10.

Figure 10:
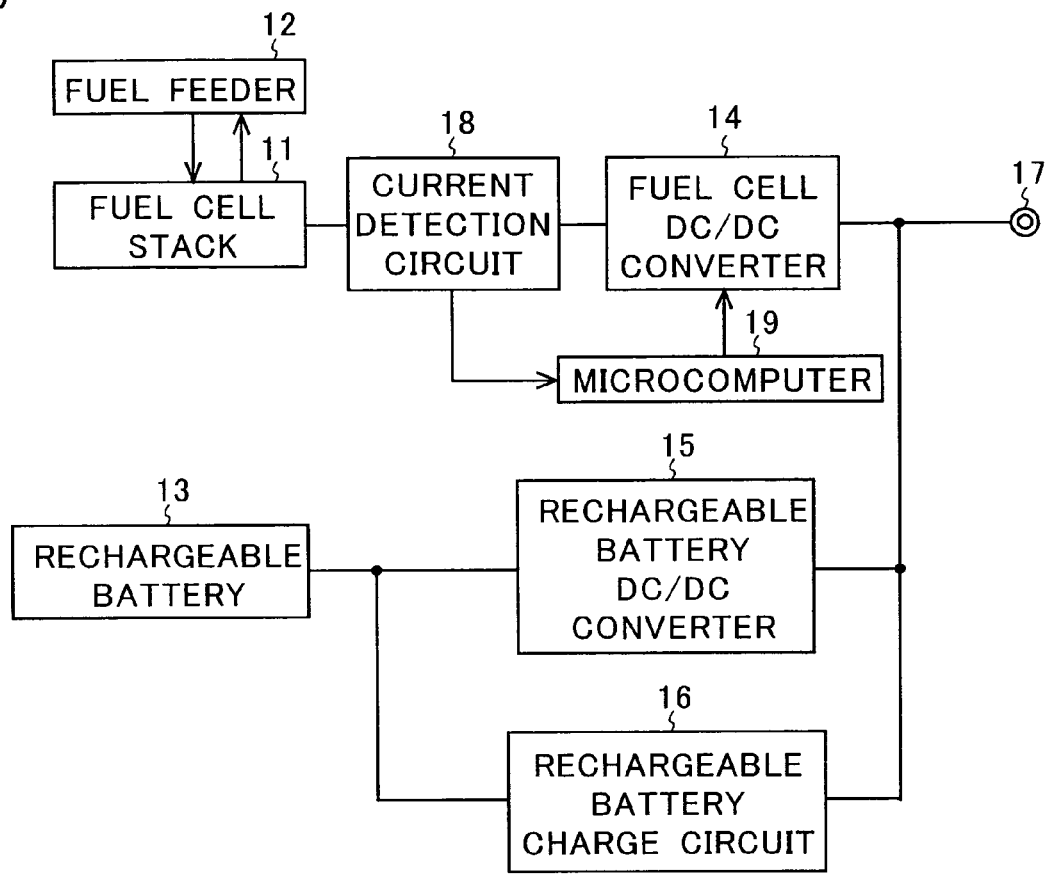
FIG. 10 is a block diagram showing an example of the configuration of a fuel cell system according to the invention that can follow an abrupt load change.

The fuel cell system according to the invention shown in FIG. 10 is built as a system in which a fuel cell and an electric storage device are provided in parallel. The fuel cell system comprises a fuel cell stack 11, a fuel feeder 12, a rechargeable battery 13 that is an electric storage device, a fuel cell DC/DC converter 14, a rechargeable battery DC/DC converter 15 that is a rechargeable battery discharge circuit, a rechargeable battery charge circuit 16, a system output terminal 17, a current detection circuit 18, and a microcomputer 19. The system output terminal 17 is a direct current output terminal composed of a positive terminal and a negative terminal.

The fuel feeder 12 supplies the fuel cell stack 11 with a predetermined amount of fuel at regular intervals, and recovers the fuel that has not been consumed by the fuel cell stack 11. The fuel cell stack 11 is connected, via the current detection circuit 18 that detects the output current of the fuel cell stack 11, to the input terminal of the fuel cell DC/DC converter 14. The positive output terminal of the fuel cell DC/DC converter 14 is connected to the positive terminal of the system output terminal 17. The rechargeable battery 13 is connected to the input terminal of the rechargeable battery DC/DC converter 15 and to the output terminal of the rechargeable battery charge circuit 16. The positive output terminal of the rechargeable battery DC/DC converter 15 and the positive input terminal of the rechargeable battery charge circuit 16 are connected to the positive terminal of the system output terminal 17. The negative output terminal of the fuel cell DC/DC converter 14, the negative output terminal of the rechargeable battery DC/DC converter 15, and the negative input terminal of the rechargeable battery charge circuit 16 are connected to the negative terminal of the system output terminal 17. The microcomputer 19 controls the fuel cell DC/DC converter 14 based on the detection result of the current detection circuit 18. In the fuel cell system according to the invention shown in FIG. 10, the fuel feeder 12 operates with electric power derived from the output of the fuel cell system. During system start-up, the fuel feeder 12 is made to operate with electric power derived from the output of the rechargeable battery 13.

The system output terminal 17 is connected to the direct current input terminal of an electric appliance (load), whereby electric power is supplied to the electric appliance from the fuel cell system according to the invention shown in FIG. 10.

The fuel cell DC/DC converter 14 steps up the direct current voltage outputted from the fuel cell stack 11, in principle, to a direct current voltage of a predetermined value (PV1), and then outputs it. The rechargeable battery DC/DC converter 15 steps up the direct current voltage outputted from the rechargeable battery 13 to a direct current voltage of a predetermined value (PV2), and then outputs it. Note that the output voltage value (PV1) of the fuel cell DC/DC converter 14 is set larger than the output voltage value (PV2) of the rechargeable battery DC/DC converter 15. Thus, in principle, only the electric power outputted from the fuel cell DC/DC converter 14 is supplied to the electric appliance via the system output terminal 17. Although the rechargeable battery DC/DC converter 15 is always ON when the system is operating, in principle, it does not supply electric power outputted therefrom to the electric appliance via the system output terminal 17, and is in a so-called standby state.

However, when the output current of the fuel cell stack 11 is increased to the limit value $I_{LIM}$ due to an increase in the electric power required by the electric appliance, the microcomputer 19 fixes the step-up ratio of the fuel cell DC/DC converter 14. As a result, the output voltage of the fuel cell DC/DC converter 14 is stepped down to the predetermined value (PV2). That is, when the output current of the fuel cell stack 11 reaches the limit value $I_{LIM}$, the output voltage values of the fuel cell DC/DC converter 14 and the rechargeable battery DC/DC converter 15 both become equal to the predetermined value (PV2). In this state, the electric power outputted from the fuel cell DC/DC converter 14 and the electric power outputted from the rechargeable battery DC/DC converter 15 are supplied to the electric appliance via the system output terminal 17, and the output current of the fuel cell stack 11 is clamped at the limit value $I_{LIM}$.

When there is surplus electric power (=the electric power outputted from the fuel cell stack 11 minus the electric power consumed in the fuel cell system minus the electric power required by the electric appliance), the rechargeable battery charge circuit 16 is turned ON. By contrast, when there is no surplus electric power, the rechargeable battery charge circuit 16 is turned OFF. The rechargeable battery charge circuit 16 monitors the input terminal voltage, that is, the voltage of the system output terminal 17. When the voltage of the system output terminal 17 is equal to the predetermined value (PV1), the rechargeable battery charge circuit 16 is turned ON. By contrast, when the voltage of the system output terminal 17 is equal to the predetermined value (PV2), the rechargeable battery charge circuit 16 is turned OFF (note that the voltage monitor of the system output terminal 17 and the ON/OFF switch controller are always ON). Thus, when there is surplus electric power, the rechargeable battery charge circuit 16 charges the rechargeable battery 13 using the surplus electric power.

Figure 11:
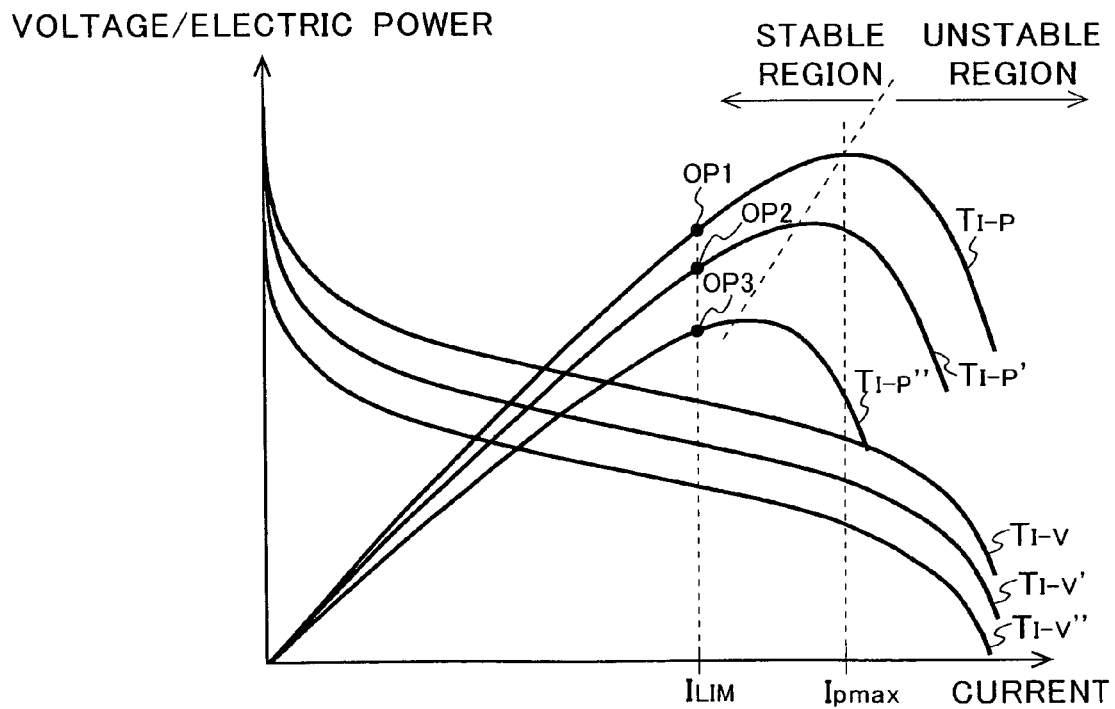
FIG. 11 is a graph showing the current-voltage characteristic and the current-power characteristic of the fuel cell stack.

The above-described limit value $I_{LIM}$ is set equal to or smaller than the output current value Ipmax of the fuel cell stack 111 at which the output electric power of the fuel cell stack 11 in the initial state reaches the maximum level (see FIG. 11). Thus, the fuel cell stack 11 does not operate within the current range larger than Ipmax. This eliminates the possibility of reducing the life of the fuel cell stack 11 in the initial state.

The fuel cell stack 11 tends to produce an increasingly lower output the longer it is used. Thus, the fuel cell stack 11 has the current-voltage characteristic and the current-power characteristic shown in FIG. 11. In FIG. 11, $T_{I-V}$ and $T_{I-P}$ indicate the output current-output voltage characteristic curve and the output current-output power characteristic curve, respectively, of the fuel cell stack 11 in the initial state, $T_{I-V}'$ and $T_{I-P}'$ indicate the output current-output voltage characteristic curve and the output current-output power characteristic curve, respectively, of the fuel cell stack 11 that has been used for "A" hours, and $T_{I-V}''$ and $T_{I-P}''$ indicate the output current-output voltage characteristic curve and the output current-output power characteristic curve, respectively, of the fuel cell stack 11 that has been used for "B" (>A) hours.

Given the above-described tendency of the fuel cell stack 11, for the fuel cell stack 11 to operate always within the stable region, that is, for the fuel cell stack 11 to operate within the stable region even when it has gone through its maximum use duration (that is, its set lifetime), the limit value $I_{LIM}$ needs to be set equal to or smaller than the output current that the fuel cell stack 11 yields when operating at the maximum output electric power at the end of the maximum use duration. Consider, for example, a case where the maximum use duration is "B" hours and the limit value $I_{LIM}$ is set as shown in FIG. 11. In this case, the operating point in the initial state, the operating point after "A" hours' use, and the operating point after "B" hours' use are located at OP1, OP2, and OP3, respectively. This means that the fuel cell stack 11 keeps operating in the stable region. Here, however, attention needs to be paid to this problem: when the limit value $I_{LIM}$ is set equal to or smaller than the output current that the fuel cell stack 11 yields when operating at the maximum output electric power at the end of the maximum use duration, the fuel cell stack 11 may not operate at its optimum performance in the initial state.

Now, another example of the configuration of the fuel cell system according to the invention that can follow an abrupt load change will be described with reference to FIG. 12. Note that, in FIG. 12, such members as are found also in FIG. 10 are identified with common reference numerals, and their detailed descriptions will be omitted.

Figure 12:
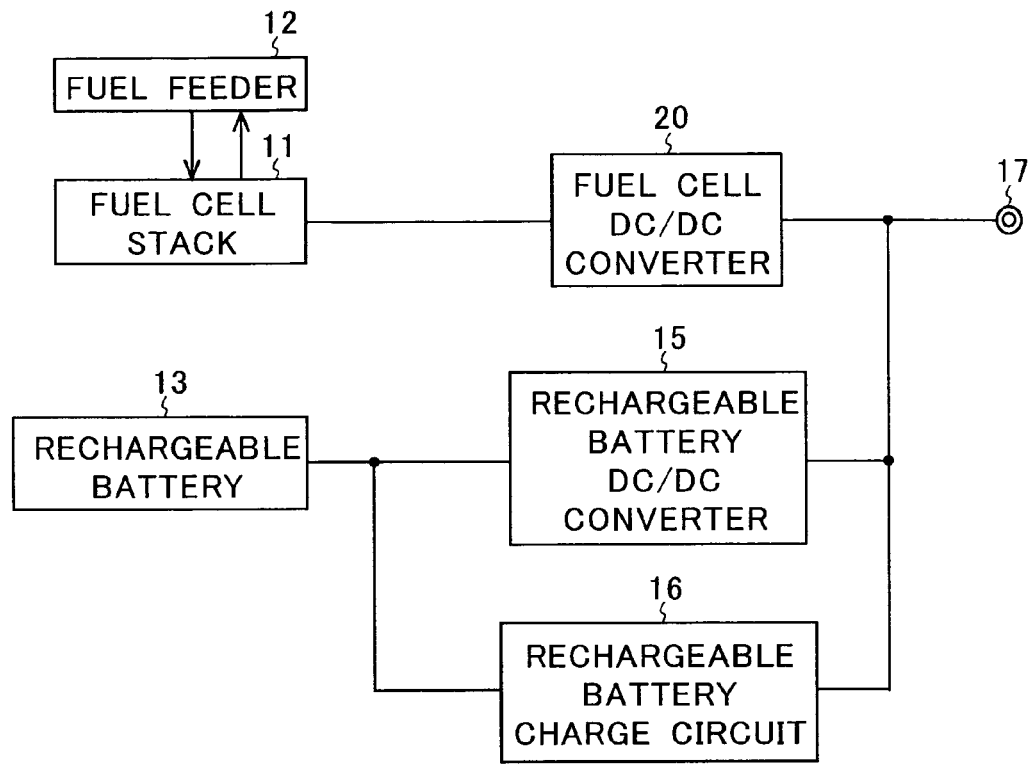
FIG. 12 is a block diagram showing another example of the configuration of the fuel cell system according to the invention that can follow an abrupt load change.

The fuel cell system according to the invention shown in FIG. 12 differs from the fuel cell system according to the invention shown in FIG. 10 in that the current detection circuit 18 and the microcomputer 19 are removed, and the fuel cell DC/DC converter 14 is replaced with a fuel cell DC/DC converter 20.

The fuel cell DC/DC converter 20 steps up the direct current voltage outputted from the fuel cell stack 11, in principle, to a direct current voltage of the predetermined value (PV1), and then outputs it. Thus, in principle, only the electric power outputted from the fuel cell DC/DC converter 20 is supplied to the electric appliance via the system output terminal 17. Although the rechargeable battery DC/DC converter 15 is always ON when the system is operating, in principle, it does not supply electric power outputted therefrom to the electric appliance via the system output terminal 17, and is in a so-called standby state.

Note that there is an upper limit to the step-up ratio of the fuel cell DC/DC converter 20. When the output voltage of the fuel cell stack 11 is reduced to the limit value $V_{LIM}$ due to an increase in the electric power required by the electric appliance, the step-up ratio of the fuel cell DC/DC converter 20 reaches the upper limit. As a result, the output voltage of the fuel cell DC/DC converter 20 drops down to the predetermined value (PV2). In this state, the electric power outputted from the fuel cell DC/DC converter 20 and the electric power outputted from the rechargeable battery DC/DC converter 15 are supplied to the electric appliance via the system output terminal 17, and the output voltage of the fuel cell stack 11 is clamped at the limit value $V_{LIM}$.

When there is surplus electric power (=the electric power outputted from the fuel cell stack 11 minus the electric power consumed in the fuel cell system minus the electric power required by the electric appliance), the rechargeable battery charge circuit 16 is turned ON. By contrast, when there is no surplus electric power, the rechargeable battery charge circuit 16 is turned OFF. The rechargeable battery charge circuit 16 monitors the input terminal voltage, that is, the voltage of the system output terminal 17. When the voltage of the system output terminal 17 is equal to the predetermined value (PV1), the rechargeable battery charge circuit 16 is turned ON. By contrast, when the voltage of the system output terminal 17 is equal to the predetermined value (PV2), the rechargeable battery charge circuit 16 is turned OFF (note that the voltage monitor of the system output terminal 17 and the ON/OFF switch controller are always ON). Thus, when there is surplus electric power, the rechargeable battery charge circuit 16 charges the rechargeable battery 13 using the surplus electric power.

Figure 13:
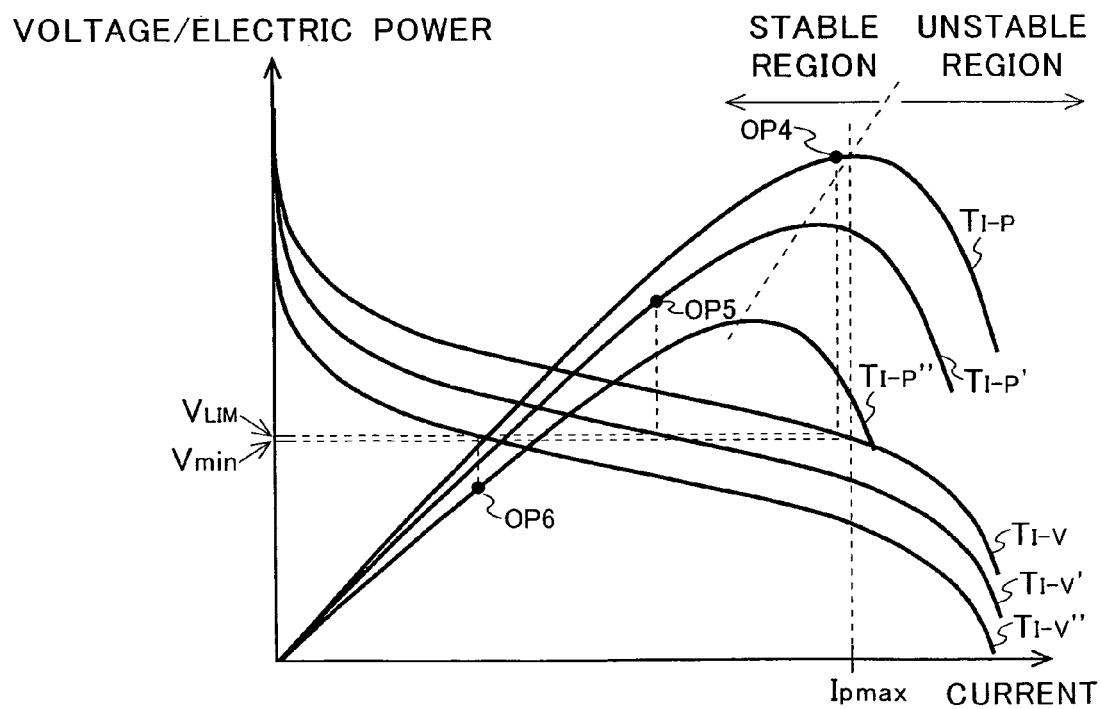
FIG. 13 is a graph showing the current-voltage characteristic and the current-power characteristic of the fuel cell stack.

The above-described limit value $V_{LIM}$ is set equal to or larger than the output voltage value Vmin of the fuel cell stack 11 at which the output electric power of the fuel cell stack 11 reaches the maximum level in the initial state (see FIG. 13). Thus, the fuel cell stack 11 does not operate within the voltage range lower than Vmin (=the current range larger than Ipmax). This eliminates the possibility of reducing the life of the fuel cell stack 11 in the initial state.

The fuel cell stack 11 tends to produce an increasingly lower output the longer it is used. Thus, the fuel cell stack 11 has the current-voltage characteristic and the current-power characteristic shown in FIG. 13. In FIG. 13, $T_{I-V}$ and $T_{I-P}$ indicate the output current-output voltage characteristic curve and the output current-output power characteristic curve, respectively, of the fuel cell stack 11 in the initial state, $T_{I-V}'$ and $T_{I-P}'$ indicate the output current-output voltage characteristic curve and the output current-output power characteristic curve, respectively, of the fuel cell stack 11 that has been used for "A" hours, and $T_{I-V}''$ and $T_{I-P}''$ indicate the output current-output voltage characteristic curve and the output current-output power characteristic curve, respectively, of the fuel cell stack 11 that has been used for "B" (>A) hours.

Given the above-described tendency of the fuel cell stack 11, for the fuel cell stack 11 to operate always within the stable region, that is, for the fuel cell stack 11 to operate within the stable region even when it is in the initial state, the limit value $V_{LIM}$ needs to be set equal to or larger than the output voltage value of the fuel cell stack 11 at which the output electric power of the fuel cell stack 11 in the initial state reaches the maximum level. Consider, for example, a case where the maximum use duration is "B" hours and the limit value $V_{LIM}$ is set as shown in FIG. 13. In this case, the operating point in the initial state, the operating point after "A" hours' use, and the operating point after "B" hours' use are located at OP4, OP5, and OP6, respectively. This means that the fuel cell stack 11 keeps operating in the stable region. Here, however, attention needs to be paid to this problem: when the limit value $V_{LIM}$ is set equal to or larger than the output voltage value of the fuel cell stack 11 at which the output electric power of the fuel stack 11 in the initial state reaches the maximum level, the output of the fuel cell stack 11 greatly lowers as the use duration increases.

Now, still another example of the configuration of the fuel cell system according to the invention that can follow an abrupt load change will be described with reference to FIG. 14. Note that, in FIG. 14, such members as are found also in FIG. 10 are identified with common reference numerals, and their detailed descriptions will be omitted.

Figure 15:
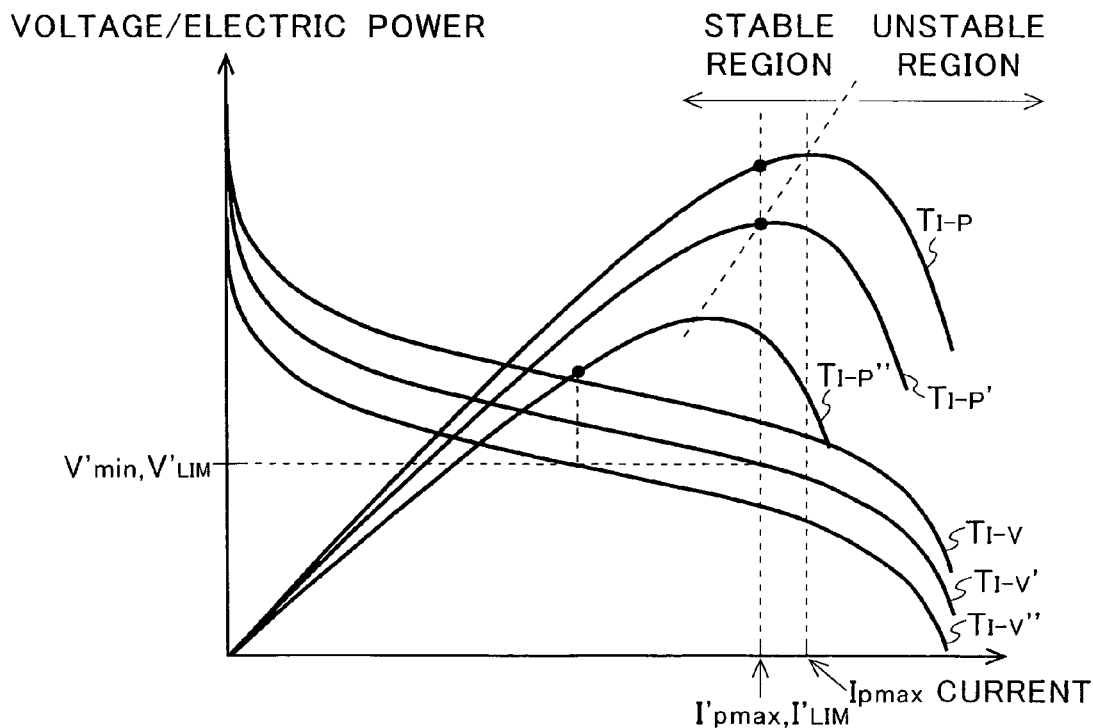
FIG. 15 is a graph showing the current-voltage characteristic and the current-power characteristic of the fuel cell stack.

The fuel cell stack 11 tends to produce an increasingly lower output voltage the longer it is used. Thus, the fuel cell stack 11 has the current-voltage characteristic and the current-power characteristic shown in FIG. 15. In FIG. 15, $T_{I-V}$ and $T_{I-P}$ indicate the output current-output voltage characteristic curve and the output current-output power characteristic curve, respectively, of the fuel cell stack 11 in the initial state, $T_{I-V}'$ and $T_{I-P}'$ indicate the output current-output voltage characteristic curve and the output current-output power characteristic curve, respectively, of the fuel cell stack 11 that has been used for "A" hours, and $T_{I-V}''$ and $T_{I-P}''$ indicate the output current-output voltage characteristic curve and the output current-output power characteristic curve, respectively, of the fuel cell stack 11 that has been used for "B" (>A) hours.

Figure 14:
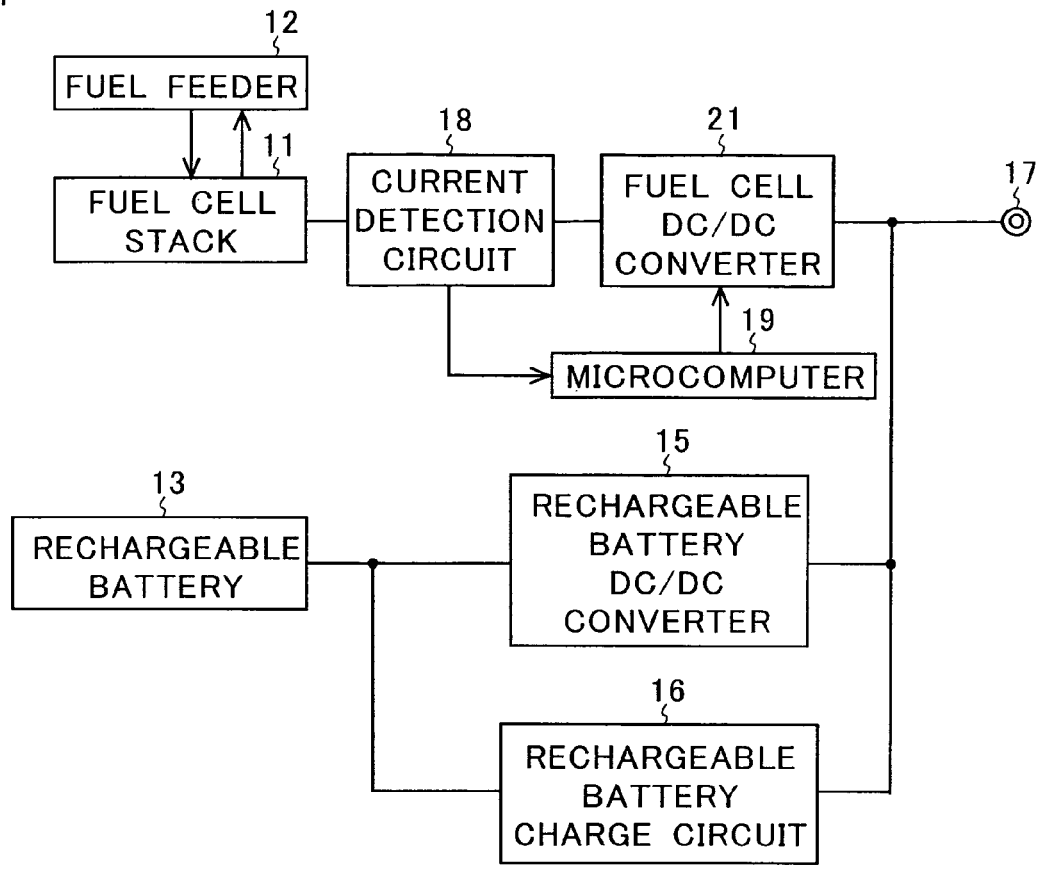
FIG. 14 is a block diagram showing still another example of the configuration of the fuel cell system according to the invention that can follow an abrupt load change.

The fuel cell system according to the invention shown in FIG. 14 differs from the fuel cell system according to the invention shown in FIG. 10 in that the fuel cell DC/DC converter 14 is replaced with a fuel cell DC/DC converter 21.

When there is surplus electric power (=the electric power outputted from the fuel cell stack 11 minus the electric power consumed in the fuel cell system minus the electric power required by the electric appliance), the rechargeable battery charge circuit 16 is turned ON. By contrast, when there is no surplus electric power, the rechargeable battery charge circuit 16 is turned OFF. The rechargeable battery charge circuit 16 monitors the input terminal voltage, that is, the voltage of the system output terminal 17. When the voltage of the system output terminal 17 is equal to the predetermined value (PV1), the rechargeable battery charge circuit 16 is turned ON. By contrast, when the voltage of the system output terminal 17 is equal to the predetermined value (PV2), the rechargeable battery charge circuit 16 is turned OFF (note that the voltage monitor of the system output terminal 17 and the ON/OFF switch controller are always ON). Thus, when there is surplus electric power, the rechargeable battery charge circuit 16 charges the rechargeable battery 13 using the surplus electric power.

The fuel cell DC/DC converter 21 steps up the direct current voltage outputted from the fuel cell stack 11, in principle, to a direct current voltage of the predetermined value (PV1), and then outputs it. Note that the output voltage value (PV1) of the fuel cell DC/DC converter 21 is set larger than the output voltage value (PV2) of the rechargeable battery DC/DC converter 15. Thus, in principle, only the electric power outputted from the fuel cell DC/DC converter 21 is supplied to the electric appliance via the system output terminal 17. Although the rechargeable battery DC/DC converter 15 is always ON when the system is operating, in principle, it does not supply electric power outputted therefrom to the electric appliance via the system output terminal 17, and is in a so-called standby state.

However, when the output current of the fuel cell stack 11 is increased to the limit value $I'_{LIM}$ due to an increase in the electric power required by the electric appliance, the microcomputer 19 fixes the step-up ratio of the fuel cell DC/DC converter 21. As a result, the output voltage of the fuel cell DC/DC converter 21 drops down to the predetermined value (PV2). That is, when the output current of the fuel cell stack 11 reaches the limit value $I'_{LIM}$, the output voltage value of the fuel cell DC/DC converter 21 and the output voltage value of the rechargeable battery DC/DC converter 15 both become equal to the predetermined value (PV2). In this state, the electric power outputted from the fuel cell DC/DC converter 21 and the electric power outputted from the rechargeable battery DC/DC converter 15 are supplied to the electric appliance via the system output terminal 17, and the output current of the fuel cell stack 11 is clamped at the limit value $I'_{LIM}$.

Note that there is an upper limit to the step-up ratio of the fuel cell DC/DC converter 21. When the output voltage of the fuel cell stack 11 is reduced to the limit value $V'_{LIM}$ due to an increase in the electric power required by the electric appliance, the step-up ratio of the fuel cell DC/DC converter 21 reaches the upper limit. As a result, the output voltage of the fuel cell DC/DC converter 21 drops down to the predetermined value (PV2). In this state, the electric power outputted from the fuel cell DC/DC converter 21 and the electric power outputted from the rechargeable battery DC/DC converter 15 are supplied to the electric appliance via the system output terminal 17, and the output voltage of the fuel cell stack 11 is clamped at the limit value $V'_{LIM}$.

Here, consider, for example, a case where the limit value $I'_{LIM}$ is set equal to the output current value I'pmax of the fuel cell stack 11 at which the output electric power of the fuel cell stack 11 that has been used for "A" hours reaches the maximum level, and the limit value $V'_{LIM}$ is set equal to the output voltage value V'min of the fuel cell stack 11 at which the output electric power of the fuel cell stack 11 that has been used for "A" hours reaches the maximum level. In this case, when the use duration is equal to or less than "A" hours, the limit value I'$_{LIM}$ prevents the fuel cell stack 11 from operating within the current range larger than I'pmax. This eliminates the possibility of reducing the life of the fuel cell stack 11 when the use duration is equal to or less than "A" hours. On the other hand, when the use duration is more than "A" hours, the limit value V'$_{LIM}$ prevents the fuel cell stack 11 from operating within the voltage range lower than V'min. This eliminates the possibility of reducing the life of the fuel cell stack 11 when the use duration is more than "A" hours.

Thanks to the fuel cell DC/DC converter 21 performing the above-described operation, the fuel cell system according to the invention shown in FIG. 14 can extract a sufficient amount of electric power from the fuel cell stack 11 even in the initial state while preventing substantial reduction in the electric power outputted from the fuel cell stack 11 even after a long duration of use.

Note that the microcomputer 19 of the fuel cell system according to the invention shown in FIG. 10 may be additionally provided with a function of measuring the use duration of the fuel cell system. With this function, the limit value I$_{LIM}$ is decreased as the use duration increases, so that, at any time throughout the use duration, it is equal to or smaller than the output current that the fuel cell stack 11 yields when operating at the maximum output electric power. This makes it possible to extract a sufficient amount of electric power from the fuel cell stack 11 even in the initial state while preventing substantial reduction in the electric power outputted from the fuel cell stack 11 even after a long duration of use.

Alternatively, the fuel cell DC/DC converter 20 of the fuel cell system according to the invention shown in FIG. 12 may be additionally provided with a function of measuring the use duration of the fuel cell system. With this function, as the use duration increases, the upper limit of the step-up ratio is increased and the limit value V$_{LIM}$ is decreased, so that, at any time throughout the use duration, the limit value V$_{LIM}$ is equal to or larger than the output voltage value of the fuel cell stack 11 at which the output electric power of the fuel cell stack 11 reaches the maximum level. This makes it possible to extract a sufficient amount of electric power from the fuel cell stack 11 even in the initial state while preventing substantial reduction in the electric power outputted from the fuel cell stack 11 even after a long duration of use.

Next, still another example of the configuration of the fuel cell system according to the invention that can follow an abrupt load change will be described with reference to FIG. 16. Note that, in FIG. 16, such members as are found also in FIG. 10 are identified with common reference numerals, and their detailed descriptions will be omitted.

Figure 16:
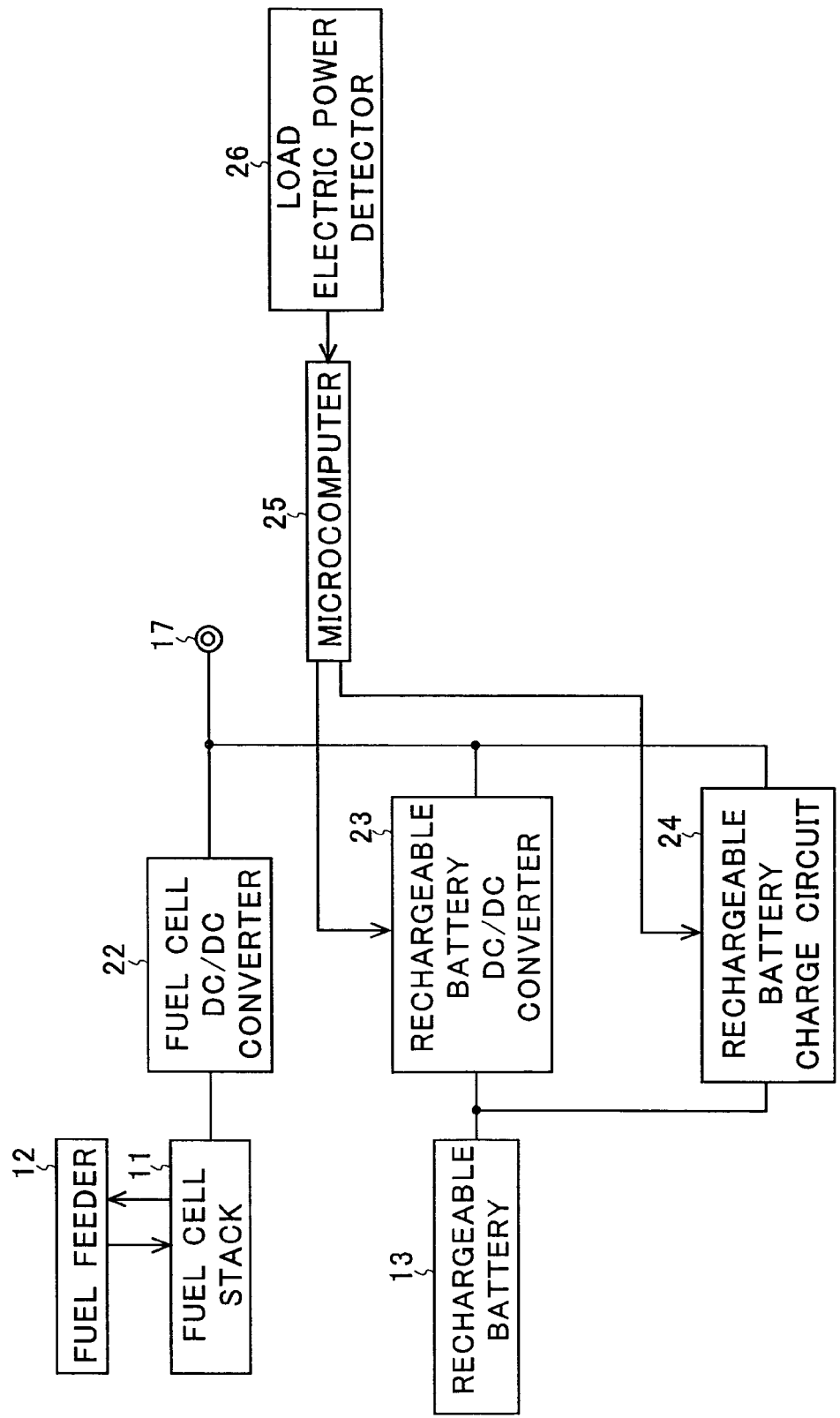
FIG. 16 is a block diagram showing still another example of the configuration of the fuel cell system according to the invention that can follow an abrupt load change.

The fuel cell system according to the invention shown in FIG. 16 differs from the fuel cell system according to the invention shown in FIG. 10 in that the fuel cell DC/DC converter 14, the rechargeable battery DC/DC converter 15, the rechargeable battery charge circuit 16, and the microcomputer 19 are replaced with a fuel cell DC/DC converter 22, a rechargeable battery DC/DC converter 23, a rechargeable battery charge circuit 24, and a microcomputer 25, respectively, the current detection circuit 18 is removed, and a load electric power detection circuit 26 is additionally provided.

The fuel cell DC/DC converter 22 is a DC/DC converter that steps up the direct current voltage outputted from the fuel cell stack 11 to a direct current voltage of the predetermined value (PV1) and then outputs it. The rechargeable battery DC/DC converter 23 is a DC/DC converter that steps up the direct current voltage outputted from the rechargeable battery 13 to a direct current voltage of the predetermined value (PV2) and then outputs it so as to feed the electric power specified by the microcomputer 25 to the system output terminal 17. The rechargeable battery charge circuit 24 is a charge circuit that charges the rechargeable battery 13 at the current value specified by the microcomputer 25. The load electric power detection circuit 26 is a circuit that detects the electric power required of the fuel cell system by the electric appliance connected to the system output terminal 17 (hereinafter, referred to as the load electric power) and sends the detection result to the microcomputer 25.

Now, the operation of the microcomputer 25 will be described. The microcomputer 25 has previously stored, in an internal memory provided therein, the target electric power value of the fuel cell stack 11 and the value of the electric power consumed in the fuel cell system (e.g., the operating electric power of the fuel feeder 12). The microcomputer 25 compares the value obtained by subtracting the electric power consumed in the fuel cell system from the target electric power value of the fuel cell stack 11 (hereinafter referred to as the target load suppliable electric power) with the load electric power detected by the load electric power detection circuit 26.

When the target load suppliable electric power is higher than the load electric power, the microcomputer 25 controls the charge current value of the rechargeable battery charge circuit 24 according to the load electric power, so that the charge electric power of the rechargeable battery 13 becomes equal to the value obtained by subtracting the load electric power from the target load suppliable electric power. Furthermore, the microcomputer 25 makes the output voltage value (PV2) of the rechargeable battery DC/DC converter 23 smaller than the output voltage value (PV1) of the fuel cell DC/DC converter 22, so that no electric power is supplied to the system output terminal 17 from the rechargeable battery DC/DC converter 23 even though the rechargeable battery DC/DC converter 23 is ON.

When the target load suppliable electric power is lower than the load electric power, the microcomputer 25 makes the output voltage value (PV2) of the rechargeable battery DC/DC converter 23 equal to the output voltage value (PV1) of the fuel cell DC/DC converter 22, so that the discharge electric power of the rechargeable battery 13 becomes equal to the value obtained by subtracting the target load suppliable electric power from the load electric power, and causes the rechargeable battery DC/DC converter 23 to output the electric power according to the load electric power. Furthermore, the microcomputer 25 turns the rechargeable battery charge circuit 24 OFF, and thereby reduces the charge current of the rechargeable battery charge circuit 24 to zero.

When the target load suppliable electric power is equal to the load electric power, the microcomputer 25 makes the output voltage value (PV2) of the rechargeable battery DC/DC converter 23 smaller than the output voltage value (PV1) of the fuel cell DC/DC converter 22 to reduce both the charge electric power and the discharge electric power of the rechargeable battery 13 to zero, so that no electric power is supplied to the system output terminal 17 from the rechargeable battery DC/DC converter 23 even though the rechargeable battery DC/DC converter 23 is ON. Furthermore, the microcomputer 25 turns the rechargeable battery charge circuit 24 OFF, and thereby reduces the charge current of the rechargeable battery charge circuit 24 to zero.

Thanks to the microcomputer 25 performing the above-described operation, it is possible to maintain the electric power outputted from the fuel cell stack 11 at the target electric power value (fixed value). Note that, when the load voltage is kept constant, the load electric power detection circuit may be replaced with a load current detection circuit that detects the current (load current) required of the fuel cell system by the electric appliance connected to the system output terminal 17.

The fuel cell system according to the invention that can follow an abrupt load change may be configured without a fuel cell DC/DC converter; for example, it may be configured so as to have a modified version of the fuel cell system according to the invention shown in FIG. 10 in which the fuel cell DC/DC converter 14, the current detection circuit 18, and the microcomputer 19 are removed, and the fuel cell stack 11 is directly connected to the output terminal of the rechargeable battery DC/DC converter 15, to the input terminal of the rechargeable battery charge circuit 16, and to the system output terminal 17. In the fuel cell system configured as described above, the output voltage of the fuel cell stack 11 lowers as the electric power required of the fuel cell system by the electric appliance connected to the system output terminal 17 increases. When the output voltage of the fuel cell stack 11 lowers until it becomes equal to the output voltage of the rechargeable battery DC/DC converter 15, the system output terminal 17 receives electric power supply from the rechargeable battery DC/DC converter 15. As a result, the electric power outputted from the fuel cell stack 11 and the electric power outputted from the rechargeable battery DC/DC converter 15 are supplied to the electric appliance via the system output terminal 17, and the output voltage of the fuel cell stack 11 is clamped at the same value as the output voltage of the rechargeable battery DC/DC converter 15.

Incidentally, in the fuel cell system, it takes some time to start to produce output after system startup because the fuel cell cannot produce output until it warms up for operation. Thus, the electric storage device needs to cover the entire load with its output until the fuel cell system starts to produce output. The means that, when the electric power remaining in the electric storage device is insufficient, the fuel cell system cannot start up.

To prevent system startup failure due to insufficient electric power remaining in the electric storage device, it is preferable that the fuel cell system according to the invention be provided with an electric storage device preferential charger that stops electric power supply to the electric appliance from the fuel cell system and preferentially charges the electric storage device when the electric power remaining in the electric storage device is equal to or lower than a predetermined value.

Figure 17:
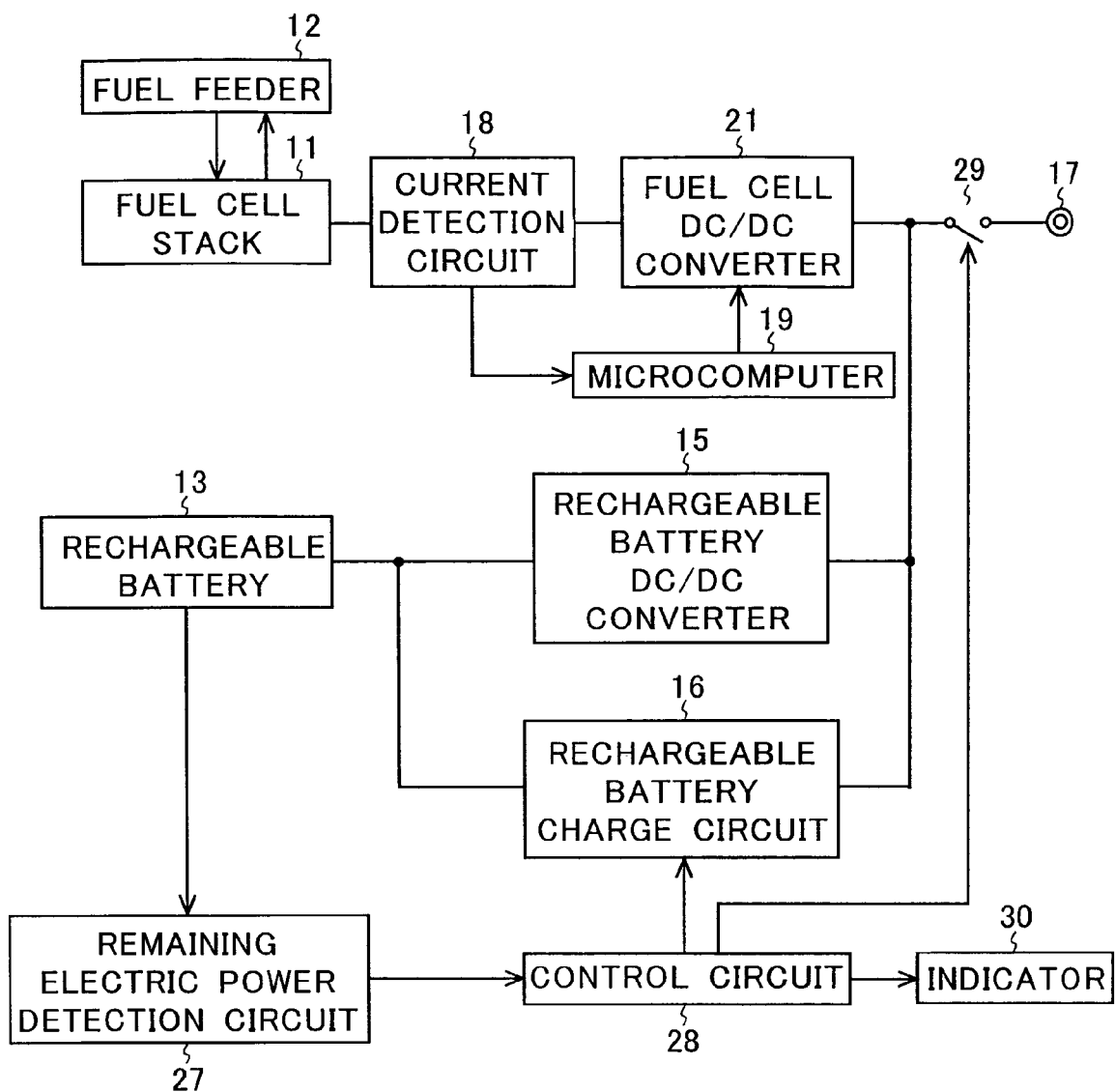
FIG. 17 is a block diagram showing still another example of the configuration of the fuel cell system according to the invention that can prevent system startup failure.

FIG. 17 shows another example of the configuration of the fuel cell system according to the invention shown in FIG. 10 in which the above-described electric storage device preferential charger that prevents system startup failure due to insufficient electric power remaining in the electric storage device is additionally provided. Note that, in FIG. 17, such members as are found also in FIG. 10 are identified with common reference numerals, and their detailed descriptions will be described.

The fuel cell system according to the invention shown in FIG. 17 differs from the fuel cell system according to the invention shown in FIG. 10 in that a remaining electric power detection circuit 27, a control circuit 28, a switch 29, and an indicator 30 are additionally provided, and the output terminal of the fuel cell DC/DC converter 14, the output terminal of the rechargeable battery DC/DC converter 15, and the input terminal of the rechargeable battery charge circuit 16 are indirectly connected, via the switch 29, to the system output terminal 17 instead of being directly connected thereto.

The remaining electric power detection circuit 27 detects the electric power remaining in the rechargeable battery 13, and sends the detection result to the control circuit 28. The control circuit 28 monitors whether or not the electric power remaining in the rechargeable battery 13 detected by the remaining electric power detection circuit 27 is equal to or lower than the predetermined value. When the electric power remaining in the rechargeable battery 13 becomes equal to or lower than the predetermined value, the control circuit 28 turns off the switch 29, which is normally kept ON, and thereby stops electric power supply from the fuel cell system to the electric appliance connected to the system output terminal 17. Moreover, the control circuit 28 forcibly turns on the rechargeable battery charge circuit 16 to preferentially charge the rechargeable battery 13, and causes the indicator 30 to indicate that the electric power remaining in the rechargeable battery 13 has become equal to or lower than the predetermined value. When the indicator 30 is a display device such as a LED, for example, the indictor 30 is made to display the electric power remaining in the rechargeable battery 13. When the indicator 30 is a sound producing device such as a buzzer, for example, the indicator 30 is made to buzz to indicate that the electric power remaining in the rechargeable battery 13 has become equal to or lower than the predetermined value. Such indications inform the user why the fuel cell system has stopped supplying electric power to the electric appliance. This helps prevent the user from being misled into thinking that the fuel cell system has failed.

In the embodiments described above, a rechargeable battery (the rechargeable battery 3, 3a, 3b, or 13) is used as an electric storage device. In practice, however, any other type of electric storage device (e.g., an electric double layer capacitor) may be used instead.

What is claimed is:

1. A fuel cell system, comprising:
   a fuel cell;
   a fuel cell DC/DC converter that steps up an output voltage of the fuel cell to a voltage of a first predetermined value to output;
   an electric storage device;
   an electric storage device DC/DC converter that converts an output voltage of the electric storage device; and
   a charge circuit that charges the electric storage device, and
   wherein a step-up ratio of the fuel cell DC/DC converter has an upper limit,
   wherein an output terminal of the fuel cell DC/DC converter, an output terminal of the electric storage device DC/DC converter, and an input terminal of the charge circuit are connected together,
   wherein the charge circuit is turned on and off according to a voltage at a connecting point of the output terminal of the fuel cell DC/DC converter, the output terminal of the electric storage device DC/DC converter, and the input terminal of the charge circuit, and
   wherein when the step-up ratio reaches the upper limit, the voltage at the connecting point drops to a second predetermined value lower than the first predetermined value.

2. The fuel cell system according to claim 1,
   wherein the electric storage device DC/DC converter is always kept ON.

3. The fuel cell system according to claim 1, further comprising:
   a remaining electric power detection circuit;
   a supply stopper; and
   an electric storage device preferential charger,
   wherein the remaining electric power detection circuit detects an electric power remaining in the electric storage device,
   wherein, when the electric power remaining in the electric storage device as detected by the remaining electric power detection circuit becomes equal to or lower than a predetermined value, the supply stopper makes the fuel cell system stop supplying electric power to an outside, and wherein, when the electric power remaining in the electric storage device as detected by the remaining electric power detection circuit becomes equal to or lower than the predetermined value, the electric storage device preferential charger preferentially charges the electric storage device.

4. The fuel cell system according to claim 3, further comprising:

an indicator that indicates, when the electric power remaining in the electric storage device as detected by the remaining electric power detection circuit becomes equal to or lower than the predetermined value, that the electric power remaining in the electric storage device has become equal to or lower than the predetermined value.

5. The fuel cell system according to claim 1, wherein the charge circuit monitors the voltage at the connecting point, is turned ON when the voltage at the connecting point is equal to the first predetermined value, and is turned OFF when the voltage at the connecting point is equal to the second predetermined value.

* * * * *